(12) United States Patent
Landis et al.

(10) Patent No.: US 11,424,805 B1
(45) Date of Patent: Aug. 23, 2022

(54) OFFLOADING BEAM TRACKING USING A CONFIGURABLE DEFLECTOR

(71) Applicant: QUALCOMM Incorporated, San Diego, CA (US)

(72) Inventors: Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/246,102

(22) Filed: Apr. 30, 2021

(51) Int. Cl.
| | |
|---|---|
| *H04B 7/06* | (2006.01) |
| *H04W 24/10* | (2009.01) |
| *H04B 17/318* | (2015.01) |
| *H04B 7/0426* | (2017.01) |
| *H04L 5/00* | (2006.01) |

(52) U.S. Cl.
CPC ........... *H04B 7/0639* (2013.01); *H04B 7/043* (2013.01); *H04B 17/318* (2015.01); *H04L 5/0023* (2013.01); *H04W 24/10* (2013.01)

(58) Field of Classification Search
CPC .... H04B 7/0639; H04B 7/043; H04B 17/318; H04L 5/0023; H04W 24/10
USPC .......................................................... 375/262
See application file for complete search history.

(56) References Cited

U.S. PATENT DOCUMENTS

2017/0331577 A1* 11/2017 Parkvall .................. H04W 8/18
2018/0287679 A1* 10/2018 Onishi ................ H04B 7/0802

* cited by examiner

*Primary Examiner* — Fitwi Y Hailegiorgis
(74) *Attorney, Agent, or Firm* — Holland & Hart LLP

(57) ABSTRACT

Methods, systems, and devices for wireless communications are described. A base station may transmit, to a channel engineering device, a configuration for performing a downlink beam refinement procedure with a user equipment (UE). The channel engineering device may transmit one or more reference signals (e.g., one or more channel state information reference signals) to the UE. For instance, the channel engineering device may transmit the one or more reference signals to the UE over resources configured by the base station or may deflect (e.g., reflect, refract, or both) reference signals transmitted to the channel engineering device by the base station. After receiving the one or more reference signals, the UE may transmit a report to the channel engineering device that the channel engineering device may use to update a channel configuration of the channel engineering device (e.g., updating a downlink beam or angle of deflection at the channel engineering device).

30 Claims, 22 Drawing Sheets

US 11,424,805 B1

OFFLOADING BEAM TRACKING USING A CONFIGURABLE DEFLECTOR

FIELD OF TECHNOLOGY

The following relates to wireless communications, including offloading beam tracking using a configurable deflector (e.g., reflector/refractor).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support offloading beam tracking using a reflector/refractor. Generally, the described techniques provide for a base station to offload at least some aspects of beam tracking to a channel engineering device (CED), which may reduce overhead at the base station. For instance, a base station may transmit, to a CED, a configuration for performing a downlink beam refinement procedure with a user equipment (UE). The CED may transmit one or more reference signals (e.g., one or more channel state information reference signals) to the UE. For instance, the CED may transmit the one or more reference signals to the UE over resources configured by the base station or may deflect (e.g., reflect, refract, or both) reference signals transmitted to the CED by the base station. After receiving the one or more reference signals, the UE may transmit a report to the CED that the CED may use to update a channel configuration of the CED (e.g., updating a downlink beam or angle of deflection at the CED).

A method for wireless communication at a channel engineering device is described. The method may include receiving, from a base station, a configuration for performing a downlink beam refinement procedure with a UE, communicating, for the downlink beam refinement procedure, one or more reference signals to the UE over one or more beams, receiving, from the UE, a report based on communicating the one or more reference signals, and updating a channel configuration used by the channel engineering device for communications between the base station and the UE via the channel engineering device based on receiving the report.

An apparatus for wireless communication at a channel engineering device is described. The apparatus may include a processor, memory in electronic communication with the processor, and instructions stored in the memory. The instructions may be executable by the processor to cause the apparatus to receive, from a base station, a configuration for performing a downlink beam refinement procedure with a UE, communicate, for the downlink beam refinement procedure, one or more reference signals to the UE over one or more beams, receive, from the UE, a report based on communicating the one or more reference signals, and update a channel configuration used by the channel engineering device for communications between the base station and the UE via the channel engineering device based on receiving the report.

Another apparatus for wireless communication at a channel engineering device is described. The apparatus may include means for receiving, from a base station, a configuration for performing a downlink beam refinement procedure with a UE, means for communicating, for the downlink beam refinement procedure, one or more reference signals to the UE over one or more beams, means for receiving, from the UE, a report based on communicating the one or more reference signals, and means for updating a channel configuration used by the channel engineering device for communications between the base station and the UE via the channel engineering device based on receiving the report.

A non-transitory computer-readable medium storing code for wireless communication at a channel engineering device is described. The code may include instructions executable by a processor to receive, from a base station, a configuration for performing a downlink beam refinement procedure with a UE, communicate, for the downlink beam refinement procedure, one or more reference signals to the UE over one or more beams, receive, from the UE, a report based on communicating the one or more reference signals, and update a channel configuration used by the channel engineering device for communications between the base station and the UE via the channel engineering device based on receiving the report.

In some examples of the method, apparatuses, and non-transitory computer-readable medium described herein, the communicating the one or more reference signals may include operations, features, means, or instructions for transmitting, by the channel engineering device, the one or more reference signals based on the configuration for performing the downlink beam refinement procedure with the UE.

Some examples of the method, apparatuses, and non-transitory computer-readable medium described herein may further include operations, features, means, or instructions for receiving, from the base station, an indication of one or more respective reference signal resources for the one or more reference signals, where the channel engineering device transmits the one or more reference signals over the one or more respective reference signal resources.

In some examples of the method, apparatuses, and non-transitory computer-readable medium, the UE is located in a first direction from the channel engineering device, and the method, apparatuses, and non-transitory computer-readable medium described herein may further include operations, features, means, or instructions for suppressing the indication of the one or more respective reference signal resources from being communicated in the first direction.

Some examples of the method, apparatuses, and non-transitory computer-readable medium described herein may further include operations, features, means, or instructions for receiving the one or more reference signals from the base station, where communicating the one or more reference signals to the UE includes deflecting the one or more reference signals to the UE.

In some examples, the one or more reference signals include a set of reference signals, and the method, apparatuses, and non-transitory computer-readable medium described herein may further include operations, features, means, or instructions for receiving, from the base station, an indication of an angle of deflection for each of the set of reference signals, and communicating via deflecting each of the set of reference signals according to the respective indication of the angle of deflection.

Some examples of the method, apparatuses, and non-transitory computer-readable medium described herein may further include operations, features, means, or instructions for transmitting, to the base station, a request for the one or more reference signals, where the one or more reference signals may be communicated based on the request.

In some examples, the base station is located in a first direction from the channel engineering device, and the method, apparatuses, and non-transitory computer-readable medium described herein may further include operations, features, means, or instructions for suppressing the report from being communicated in the first direction.

Some examples of the method, apparatuses, and non-transitory computer-readable medium described herein may further include operations, features, means, or instructions for receiving a random access channel transmission from the UE, and directing the random access channel transmission via deflection to the base station.

In some examples of the method, apparatuses, and non-transitory computer-readable medium described herein, updating the channel configuration may include operations, features, means, or instructions for updating a downlink beam used by the channel engineering device for communications between the UE and the base station, an angle of deflection used by the channel engineering device for communications between the UE and the base station, or any combination thereof.

In some examples of the method, apparatuses, and non-transitory computer-readable medium described herein, the one or more reference signals include a set of reference signals, where the report indicates a reference signal of the set received with a highest signal strength, and where updating the channel configuration may be based on the report indicating the reference signal received with the highest signal strength.

In some examples of the method, apparatuses, and non-transitory computer-readable medium described herein, the configuration for performing the downlink beam refinement procedure indicates whether the channel engineering device may be to generate the one or more reference signals at the channel engineering device or may be to receive the one or more reference signals from the base station.

A method for wireless communication at a base station is described. The method may include receiving, using a beam configuration for communicating with a UE via a channel engineering device, a random access channel transmission from the UE that is deflected by the channel engineering device, transmitting, to the channel engineering device, a configuration to enable the channel engineering device to perform a downlink beam refinement procedure with a UE based on receiving the random access channel transmission, and maintaining, after the downlink beam refinement procedure has occurred, the beam configuration based on transmitting the configuration to enable the channel engineering device to perform the downlink beam refinement procedure with the UE.

An apparatus for wireless communication at a base station is described. The apparatus may include a processor, memory in electronic communication with the processor, and instructions stored in the memory. The instructions may be executable by the processor to cause the apparatus to receive, using a beam configuration for communicating with a UE via a channel engineering device, a random access channel transmission from the UE that is deflected by the channel engineering device, transmit, to the channel engineering device, a configuration to enable the channel engineering device to perform a downlink beam refinement procedure with a UE based on receiving the random access channel transmission, and maintain, after the downlink beam refinement procedure has occurred, the beam configuration based on transmitting the configuration to enable the channel engineering device to perform the downlink beam refinement procedure with the UE.

Another apparatus for wireless communication at a base station is described. The apparatus may include means for receiving, using a beam configuration for communicating with a UE via a channel engineering device, a random access channel transmission from the UE that is deflected by the channel engineering device, means for transmitting, to the channel engineering device, a configuration to enable the channel engineering device to perform a downlink beam refinement procedure with a UE based on receiving the random access channel transmission, and means for maintaining, after the downlink beam refinement procedure has occurred, the beam configuration based on transmitting the configuration to enable the channel engineering device to perform the downlink beam refinement procedure with the UE.

A non-transitory computer-readable medium storing code for wireless communication at a base station is described. The code may include instructions executable by a processor to receive, using a beam configuration for communicating with a UE via a channel engineering device, a random access channel transmission from the UE that is deflected by the channel engineering device, transmit, to the channel engineering device, a configuration to enable the channel engineering device to perform a downlink beam refinement procedure with a UE based on receiving the random access channel transmission, and maintain, after the downlink beam refinement procedure has occurred, the beam configuration based on transmitting the configuration to enable the channel engineering device to perform the downlink beam refinement procedure with the UE.

Some examples of the method, apparatuses, and non-transitory computer-readable medium described herein may further include operations, features, means, or instructions for transmitting, to the channel engineering device, an indication of one or more reference signal resources over which the channel engineering device may be to transmit one or more reference signals.

In some examples of the method, apparatuses, and non-transitory computer-readable medium described herein, the configuration to enable the channel engineering device to perform the downlink beam refinement procedure indicates to the channel engineering device to transmit the one or more reference signals by the channel engineering device.

Some examples of the method, apparatuses, and non-transitory computer-readable medium described herein may further include operations, features, means, or instructions for transmitting one or more reference signals to the channel engineering device for deflection to the UE.

In some examples of the method, apparatuses, and non-transitory computer-readable medium, the one or more reference signals include a set of reference signals, and the method, apparatuses, and non-transitory computer-readable medium described herein may further include operations, features, means, or instructions for transmitting, to the channel engineering device, an indication of an angle of deflection for each of the set of reference signals.

Some examples of the method, apparatuses, and non-transitory computer-readable medium described herein may further include operations, features, means, or instructions for transmitting each of the set of reference signals using the beam configuration, where at least one of the set of reference signals may be associated with a different angle of deflection from another of the set of reference signals.

Some examples of the method, apparatuses, and non-transitory computer-readable medium described herein may further include operations, features, means, or instructions for receiving, from the channel engineering device, a request for the one or more reference signals, where the one or more reference signals may be transmitted based on the request.

In some examples of the method, apparatuses, and non-transitory computer-readable medium described herein, the configuration for performing the downlink beam refinement procedure indicates whether the channel engineering device may be to generate the one or more reference signals at the channel engineering device or may be to receive the one or more reference signals from the base station.

A method for wireless communication at a UE is described. The method may include transmitting, to a base station via deflection by a channel engineering device, a random access channel transmission, receiving, from the channel engineering device, one or more reference signals as part of a downlink beam refinement procedure based on transmitting the random access channel transmission to the base station, and transmitting, to the channel engineering device, a report based on receiving the one or more reference signals.

An apparatus for wireless communication at a UE is described. The apparatus may include a processor, memory in electronic communication with the processor, and instructions stored in the memory. The instructions may be executable by the processor to cause the apparatus to transmit, to a base station via deflection by a channel engineering device, a random access channel transmission, receive, from the channel engineering device, one or more reference signals as part of a downlink beam refinement procedure based on transmitting the random access channel transmission to the base station, and transmit, to the channel engineering device, a report based on receiving the one or more reference signals.

Another apparatus for wireless communication at a UE is described. The apparatus may include means for transmitting, to a base station via deflection by a channel engineering device, a random access channel transmission, means for receiving, from the channel engineering device, one or more reference signals as part of a downlink beam refinement procedure based on transmitting the random access channel transmission to the base station, and means for transmitting, to the channel engineering device, a report based on receiving the one or more reference signals.

A non-transitory computer-readable medium storing code for wireless communication at a UE is described. The code may include instructions executable by a processor to transmit, to a base station via deflection by a channel engineering device, a random access channel transmission, receive, from the channel engineering device, one or more reference signals as part of a downlink beam refinement procedure based on transmitting the random access channel transmission to the base station, and transmit, to the channel engineering device, a report based on receiving the one or more reference signals.

In some examples of the method, apparatuses, and non-transitory computer-readable medium described herein, receiving the one or more reference signals may include operations, features, means, or instructions for receiving the one or more reference signals transmitted by the channel engineering device.

In some examples of the method, apparatuses, and non-transitory computer-readable medium described herein, receiving the one or more reference signals may include operations, features, means, or instructions for receiving the one or more reference signals transmitted from the base station and deflected by the channel engineering device.

In some examples of the method, apparatuses, and non-transitory computer-readable medium described herein, the one or more reference signals include a set of reference signals, where the report indicates a reference signal of the set received with a highest signal strength.

DETAILED DESCRIPTION

Figure 1:
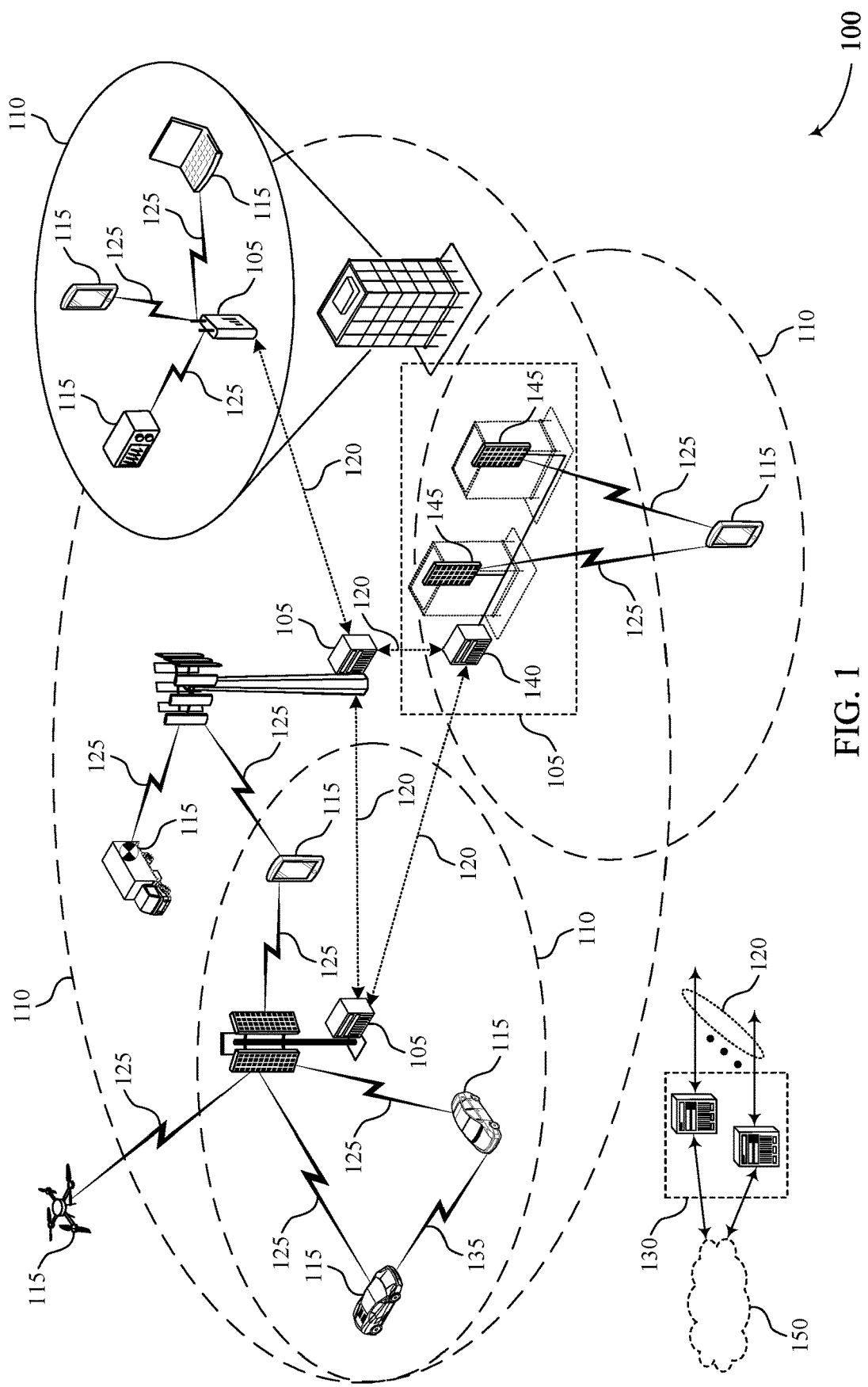
FIG. 1 illustrates an example of a system for wireless communications that supports offloading beam tracking using a reflector/refractor in accordance with aspects of the present disclosure.

In some examples, a base station and a UE may perform an initial acquisition procedure in which UE may select a beam pair link (BPL). After performing the initial acquisition procedure, the base station and the UE may perform a procedure to track a downlink transmit beam of the base station. For instance, the base station may transmit one or more channel state information (CSI) reference signals (CSI-RS) directly to the UE and may receive a CSI report indicating received beam quality from the UE after the UE has measured the CSI-RSs. Using the CSI report, the base station may perform beam management on its downlink transmit beam. However, in examples where a channel engineering device (CED) is used for deflecting (e.g., reflecting, refracting, or both) communications between the UE and the base station, tracking the downlink beam may involve increased signaling overhead due at least in part to an increase in corresponding signaling between the base station and the CED. Additionally, increased overhead may occur due to operations performed by the base station in tracking a downlink transmit beam when a CED is involved.

The methods as described herein may be directed to reducing this signaling overhead by offloading at least some of the procedure to the CED. In some examples, after performing the initial acquisition procedure, the base station may configure the CED with CSI-RS resources over which the CED may transmit CSI-RSs. After being configured with the CSI-RS resources, the CED may generate CSI-RSs and may transmit the CSI-RSs to the UE. The UE, upon receiving the CSI-RSs may generate a CSI report and may transmit the CSI report to the CED. The CED may receive the CSI report and may update a channel configuration of the CED. For instance, the CED may update a downlink beam at the CED, an angle of deflection (e.g., an angle of reflection, an angle of refraction, or both) at the CED, or both.

In other examples, after performing the initial acquisition procedure, the base station may transmit the one or more CSI-RSs to the UE via deflection by the CED. Each time the base station transmits a CSI-RS, the base station may use a same downlink transmit beam. However, the CED may use a different angle of deflection for each of the CSI-RSs received from the base station. The UE, upon receiving the CSI-RSs may generate a CSI report and may transmit the CSI report to the CED. The CED may receive the CSI report and may update a channel configuration of the CED. For instance, the CED may update a downlink beam at the CED, an angle of deflection (e.g., an angle of reflection, an angle of refraction, or both) at the CED, or both.

By using the autonomous CED beam tracking procedure and/or the semi-autonomous beam tracking procedure, the base station may avoid performing tracking on a downlink beam of the base station. For instance, as the CED may not move significantly relative to the base station, the base station may use the same downlink beam when communicating with UE 115-a via the CED after the beam tracking procedure. Additionally, the base station may have less overhead associated with tracking downlink beams and may have less signaling overhead between the base station and the CED.

Aspects of the disclosure are initially described in the context of wireless communications systems. Additional aspects of the disclosure are described in the context of a process flow. Aspects of the disclosure are further illustrated by and described with reference to apparatus diagrams, system diagrams, and flowcharts that relate to offloading beam tracking using a reflector/refractor.

FIG. 1 illustrates an example of a wireless communications system 100 that supports offloading beam tracking using a reflector/refractor in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Generally, the techniques described herein provide for a base station 105 to offload at least some aspects of beam tracking to a CED, which may reduce overhead at the base station 105. For instance, a base station 105 may transmit, to a CED, a configuration for performing a downlink beam refinement procedure with a UE 115. The CED may transmit one or more reference signals (e.g., one or more channel state information reference signals) to the UE 115. For instance, the CED may transmit the one or more reference signals to the UE 115 over resources configured by the base station 105 or may deflect (e.g., reflect, refract, or both) reference signals transmitted by the base station 105. After receiving the one or more reference signals, the UE 115 may transmit a report to the CED that the CED may use to update a channel configuration of the CED (e.g., updating a downlink beam or angle of deflection at the CED).

Figure 2:
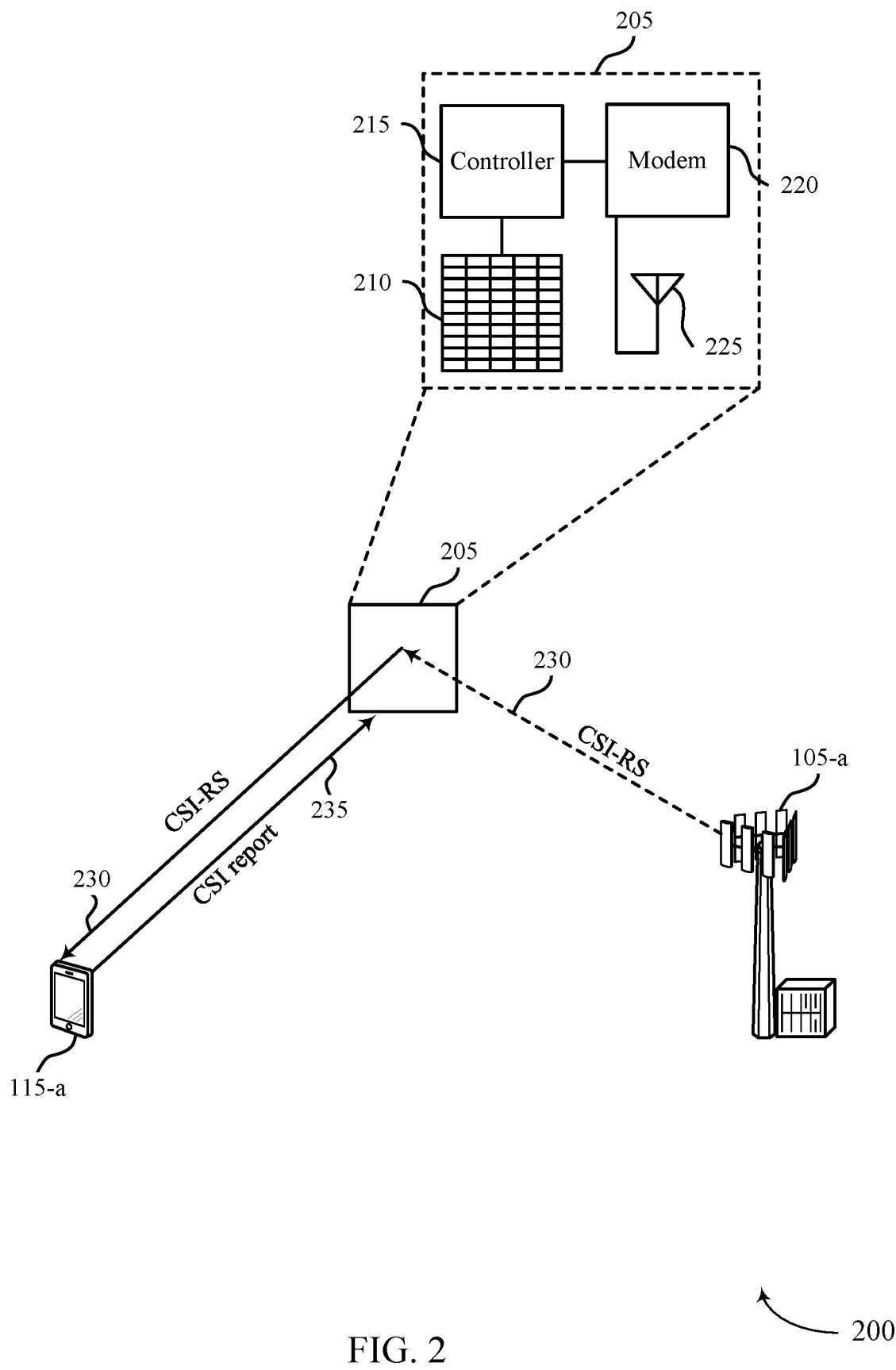
FIG. 2 illustrates an example of a wireless communications system that supports offloading beam tracking using a reflector/refractor in accordance with aspects of the present disclosure.

FIG. 2 illustrates an example of a wireless communications system 200 that supports offloading beam tracking using a reflector/refractor in accordance with aspects of the present disclosure. In some examples, wireless communications system 200 may implement aspects of wireless communications system 100. For instance, base station 105-*a* may be an example of a base station 105 as described with reference to FIG. 1 and UE 115-*a* may be an example of a UE 115 as described with reference to FIG. 1.

Wireless communications system 200 may include a CED 205. CED 205, in turn, may include an element panel 210, a controller 215, a modem 220, and an antenna 225. The element panel 210 may be coupled with the controller 215; the controller 215 may be coupled with the modem 220; and the modem 220 may be coupled with the antenna 225. In some examples, antenna 225 may be one of a set of antennas (e.g., an antenna array or antenna panel) coupled with the modem 220.

The element panel 210 may include a set of elements that the CED 205 may use to deflect (e.g., reflect, refract, or both) communications from base station 105-*a* to UE 115-*a* and vice-versa. Generally, the element panel 210 of the CED 205 may have a beam steering effect, focusing concentration effect, or energy concentration effect which may be used in network deployment to increase coverage and performance. The controller 215 may be configured to control an angle of deflection (e.g., one or more angles of reflection for elements of the element panel 210, on or more angles of refraction for elements of the element panel 210, or both) at the element panel 210. Additionally, the controller 215 may be configured to transmit signaling to and receiving signaling from modem 220. Modem 220 may be configured to receive signaling from the controller 215 and to modulate the signaling for transmission by antenna 225. Additionally, modem 220 may be configured to receive signaling from the antenna 225 and to demodulate the signaling for reception by the controller 215. Antenna 225 may be configured to transmit and receive signaling (e.g., modulated signaling).

In some examples, base station 105-*a* and UE 115-*a* may perform an initial acquisition procedure in which UE 115-*a* may select a beam pair link (BPL). After performing the initial acquisition procedure, base station 105-*a* and UE 115-*a* may perform one or more procedures to track a downlink transmit beam of base station 105. For instance, base station 105-*a* may transmit one or more CSI-RSs directly to UE 115-*a* and may receive a CSI report indicating received beam quality from UE 115-*a* after UE 115-*a* has measured the CSI-RSs. Using the CSI report, base station 105-*a* may perform beam management on its downlink transmit beam. However, in examples where CEDs 205 are deployed, tracking the downlink beam may become more complicated and/or complex and may involve increased signaling overhead due at least in part to an increase in corresponding signaling between base station 105-*a* and CED 205. Additionally, increased overhead may occur due to operations performed by base station 105-*a* in tracking a downlink transmit beam when a CED 205 is involved.

The methods as described herein may be directed to reducing this signaling overhead by offloading at least some of the procedure to the CED 205. In some examples, after performing the initial acquisition procedure, base station 105-*a* may configure the CED 205 with CSI-RS resources over which the CED 205 may transmit CSI-RSs 230. For instance, base station 105-*a* may transmit signaling (e.g., control signaling) configuring the CSI-RS resources that is received by the antenna 225 and passed to the controller 215 of the CED 205. In some examples, the CED 205 may suppress the signaling configuring the CSI-RS resources from being communicated in a direction of UE 115-*a*. After being configured with the CSI-RS resources, CED 205 may generate CSI-RSs 230 and may transmit the CSI-RSs 230 (e.g., via the antenna 225) to UE 115-*a*. UE 115-*a*, upon receiving the CSI-RSs 230 may generate a CSI report 235 and may transmit the CSI report 235 to the CED 205. The CED 205 may receive the CSI report 235 (e.g., via the antenna 225) and may update a channel configuration of the CED 205. For instance, the CED 205 may update a downlink beam at the CED 205, an angle of deflection (e.g., an angle of reflection, an angle of refraction, or both) at the CED 205, or both. Additional details about performing the procedure in this manner, which may be referred to as autonomous CED beam tracking or autonomous CED beam management, may be described herein, for instance, with reference to FIG. 3.

In other examples, after performing the initial acquisition procedure, base station 105-*a* may transmit the one or more CSI-RSs 230 to UE 115-*a* via the CED 205 (e.g., via deflection by the element panel 210). Each time base station 105-*a* transmits a CSI-RS 230, base station 105-*a* may use a same downlink transmit beam. However, the CED 205 may use a different angle of deflection for each of the CSI-RSs 230 received from base station 105-*a*. These different angles of deflection may be configured at the CED 205 by base station 105-*a* (e.g., via signaling from base station 105-*a* received at the antenna 225). UE 115-*a*, upon receiving the CSI-RSs 230 may generate a CSI report 235 and may transmit the CSI report 235 to the CED 205. The CED 205 may receive the CSI report 235 (e.g., via the antenna 225) and may update a channel configuration of the CED 205. For instance, the CED 205 may update a downlink beam at the CED 205, an angle of deflection (e.g., an angle of reflection, an angle of refraction, or both) at the CED 205, or both. In some examples, the CED 205 may transmit a request for the CSI-RS 230 to the base station. Additional details about performing the procedure in this manner, which may be referred to as semi-autonomous CED beam tracking or semi-autonomous CED beam management, may be described herein, for instance, with reference to FIG. 4.

By using the autonomous CED beam tracking procedure and/or the semi-autonomous beam tracking procedure, base station 105-*a* may avoid performing tracking on a downlink beam of base station 105-*a*. For instance, as the CED 205 may not move significantly relative to the base station 105-*a*, base station 105-*a* may use the same downlink beam when communicating with UE 115-*a* via the CED 205 (e.g., via deflection by the element panel 210) after the beam tracking procedure. Additionally, base station 105-*a* may have less overhead associated with tracking downlink beams and may have less signaling overhead between base station 105-a and the CED 205. In some examples, the CED beam management procedure may also be used for tracking uplink beams in a connected mode.

In some examples, base station 105-a may transmit, to the CED 205, a configuration for performing a downlink beam refinement procedure with UE 115-a. The configuration may indicate whether the CED 205 is to perform the autonomous beam tracking or management procedure (e.g., that the CED 205 is to generate the one or more reference signals at the CED 205) or whether the CED 205 is to perform the semi-autonomous beam tracking or management procedure (e.g., that the CED 205 is to receive the one or more CSI-RSs from base station 105-a).

During the initial acquisition procedure for autonomous or semi-autonomous CED beam tracking, base station 105-a may transmit a synchronization signal block (SSB) burst set to UE 115-a in order to broadcast the downlink beams of base station 105-a. The SSB sets may be reflected off of the CED 205 at pre-configured angles (e.g., via the element panel 210). After receiving the SSB sets, UE 115-a may select a beam pair link (BPL) and may transmit a random access channel (RACH) transmission to base station 105-a. In some examples, the RACH transmission may be reflected off of the CED 205 (e.g., via the element panel 210).

In some examples, base station 105-a and UE 115-a may also track a downlink receive beam of UE 115-a. Tracking the downlink receive beam may involve base station 105-a or CED 205 transmitting one or more CSI-RSs 230 with repetition over OFDM symbols and UE 115-a measuring them to refine the downlink receive beam of UE 115-a according to a downlink transmit beam of base station 105-a and/or the CED 205.

Figure 3:
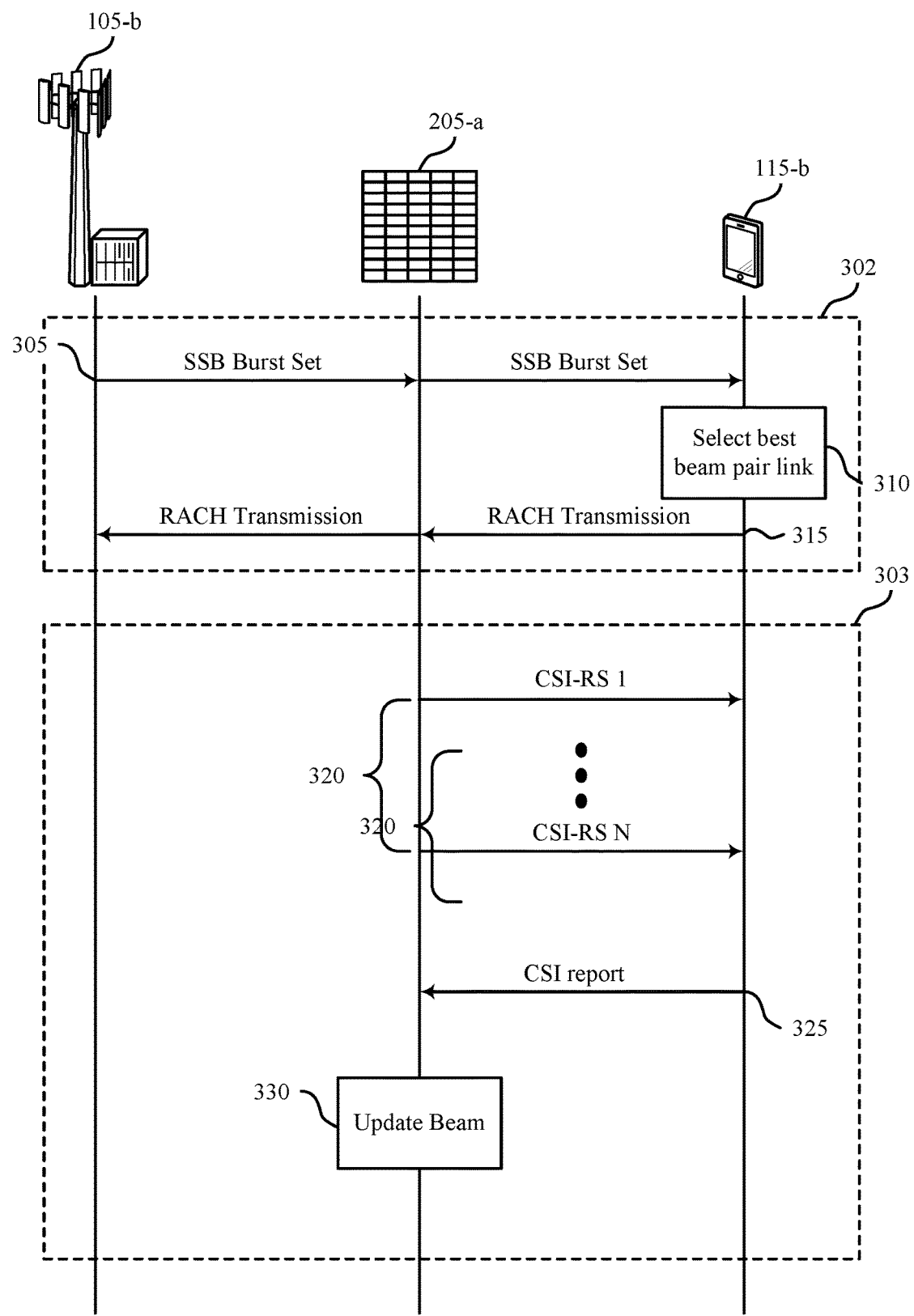
FIGS. 3 to 5 illustrate examples of process flows that support offloading beam tracking using a reflector/refractor in accordance with aspects of the present disclosure.

FIG. 3 illustrates an example of a process flow 300 that supports offloading beam tracking using a reflector/refractor in accordance with aspects of the present disclosure. In some examples, process flow 300 may implement aspects of wireless communications systems 100 and/or 200. For instance, base station 105-b may be an example of a base station 105 as described with reference to FIG. 1, UE 115-b may be an example of a UE 115 as described with reference to FIG. 1 and CED 205-a may be an example of a CED 205 as described with reference to FIG. 2.

Base station 105-b, CED 205-a, and UE 115-b may perform an initial acquisition procedure 302. For instance, at 305, base station 105-b may transmit an SSB burst set to UE 115-b which may broadcast the downlink beams of base station 105-b. Base station 105-b may transmit the SSB sets of the SSB burst set to UE 115-b via deflection by CED 205-a according to angles pre-configured at CED 205-a. At 310, UE 115-b may select a best BPL. At 315, UE 115-b may transmit a RACH transmission to base station 105-b. UE 115-b may transmit the RACH transmission to base station 105-b via deflection by CED 205-a.

After performing the initial acquisition procedure 302, base station 105-b, CED 205-a, and UE 115-b may perform an autonomous CED beam tracking and/or measurement procedure 303. For instance, at 320, CED 205-a may transmit one or more CSI-RSs (e.g., N CSI-RSs) to UE 115-b. In some examples, base station 105-b may configure the CED 205-a with CSI-RS resources over which CED 205-a transmits the one or more CSI-RSs (e.g., vi an antenna 225 of the CED). After receiving the one or more CSI-RSs, UE 115-b may measure the one or more CSI-RSs. In some examples, UE 115-b may perform CSI-RS measurement per OFDM symbol. At 325, UE 115-b may transmit a CSI report to CED 205-a indicating a channel configuration (e.g., a CED down-link beam, an angle of deflection) that the CED 205-a is to use. In some examples, UE 115-b may generate the CSI report according to a metric requested by base station 105-b or CED 205-a. In some examples, the report may indicate a CSI-RS of the CSI-RSs received with a highest signal strength. In some examples, CED 205-a may suppress the report from being communicated in a direction of base station 105-b. For example, CED 205-a may deflect the report away from the direction of the base station 105-b, or may absorb the report. At 330, CED 205-a may update the channel configuration of CED 205-a according to the CSI report. In some examples, the methods as described herein may be extended to transmit beam refinement for UE 115-b by transmitting CSI-RS beam management resources which are the same (e.g., via repetition). After 303, base station 105-b may maintain a beam configuration used to receive the RACH transmission at 315 and/or to transmit the SSB burst set at 305.

Figure 4:
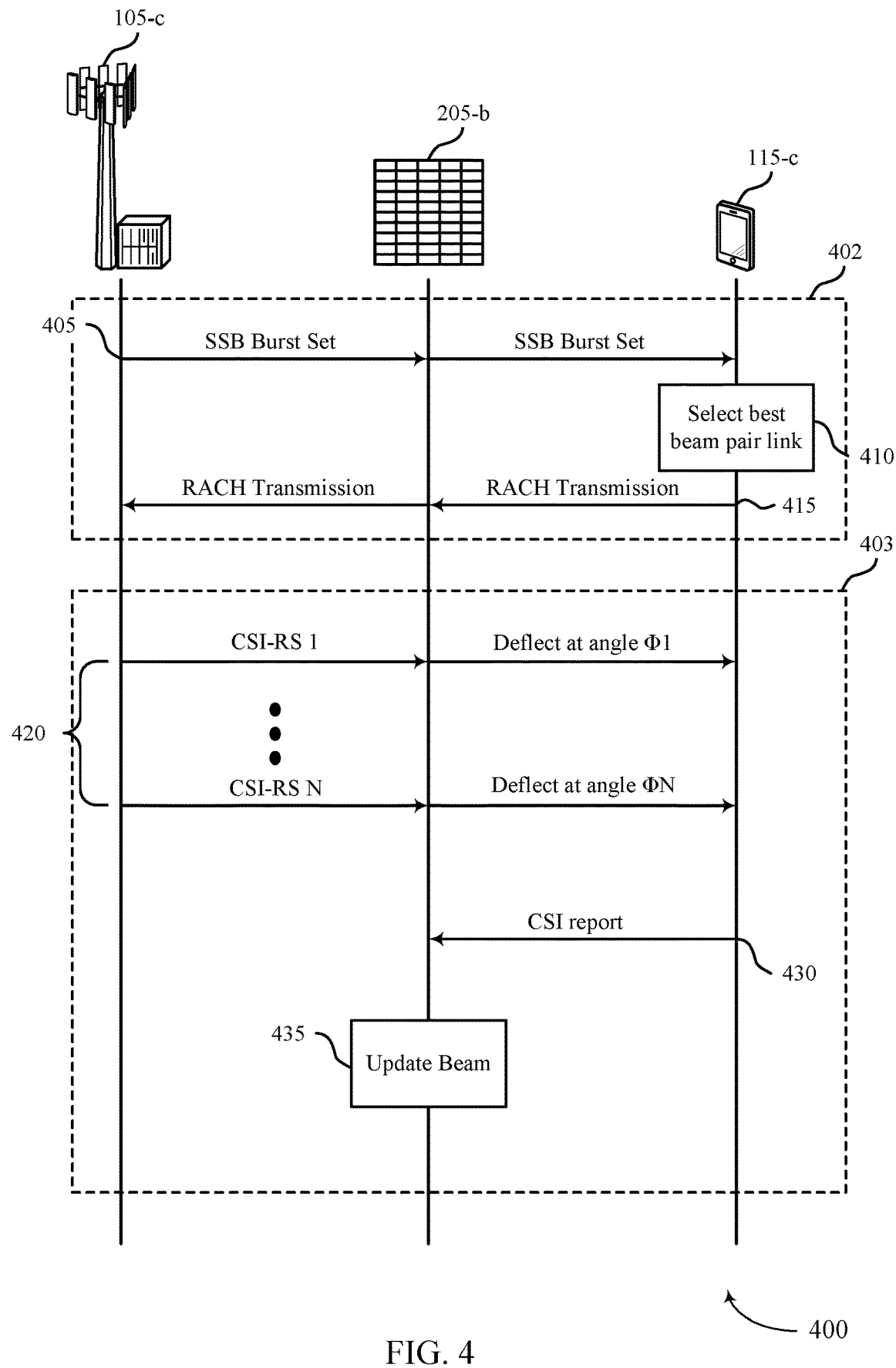

FIG. 4 illustrates an example of a process flow 400 that supports offloading beam tracking using a reflector/refractor in accordance with aspects of the present disclosure. In some examples, process flow 400 may implement aspects of wireless communications systems 100 and/or 200. For instance, base station 105-c may be an example of a base station 105 as described with reference to FIG. 1, UE 115-c may be an example of a UE 115 as described with reference to FIG. 1 and CED 205-b may be an example of a CED 205 as described with reference to FIG. 2.

Base station 105-c, CED 205-b, and UE 115-c may perform an initial acquisition procedure 402. For instance, at 405, base station 105-c may transmit an SSB burst set to UE 115-c which may broadcast the downlink beams of base station 105-c. Base station 105-c may transmit the SSB sets of the SSB burst set to UE 115-c via deflection by CED 205-b according to angles pre-configured at CED 205-b. At 410, UE 115-c may select a best BPL. At 415, UE 115-c may transmit a RACH transmission to base station 105-c. UE 115-c may transmit the RACH transmission to base station 105-c via deflection by CED 205-b.

After performing the initial acquisition procedure 402, base station 105-c, CED 205-b, and UE 115-c may perform a semi-autonomous CED beam tracking and/or measurement procedure 403. For instance, at 420, base station 105-c may transmit one or more CSI-RSs (e.g., N CSI-RSs) to UE 115-b via deflection by CED 205-b. Each CSI-RS may be transmitted to CED 205-b using a same downlink beam, but may be deflected at a different corresponding angle (e.g., deflected in different spatial directions). For instance, a first CSI-RS (i.e., CSI-RS 1) may be deflected at an angle $\Phi 1$, a second CSI-RS (i.e., CSI-RS 2) may be deflected at an angle $\Phi 2$, and so on up to the Nth CSI-RS which may be deflected at an angle $\Phi N$. In some examples, base station 105-b may configure CED 205-b with the different deflection angles. At 425, UE 115-c may transmit a CSI report to CED 205-b indicating a channel configuration (e.g., a CED downlink beam, an angle of deflection) that the CED 205-b is to use. In some examples, UE 115-c may generate the CSI report according to a metric requested by base station 105-c or CED 205-b. In some examples, the report may indicate a CSI-RS of the CSI-RSs received with a highest signal strength. In some examples, CED 205-b may suppress the report from being communicated in a direction of base station 105-c. At 330, CED 205-b may update the channel configuration of CED 205-b according to the CSI report. After 403, base station 105-c may maintain a beam configuration used to receive the RACH transmission at 415 and/or to transmit the SSB burst set at 405.

Figure 5:
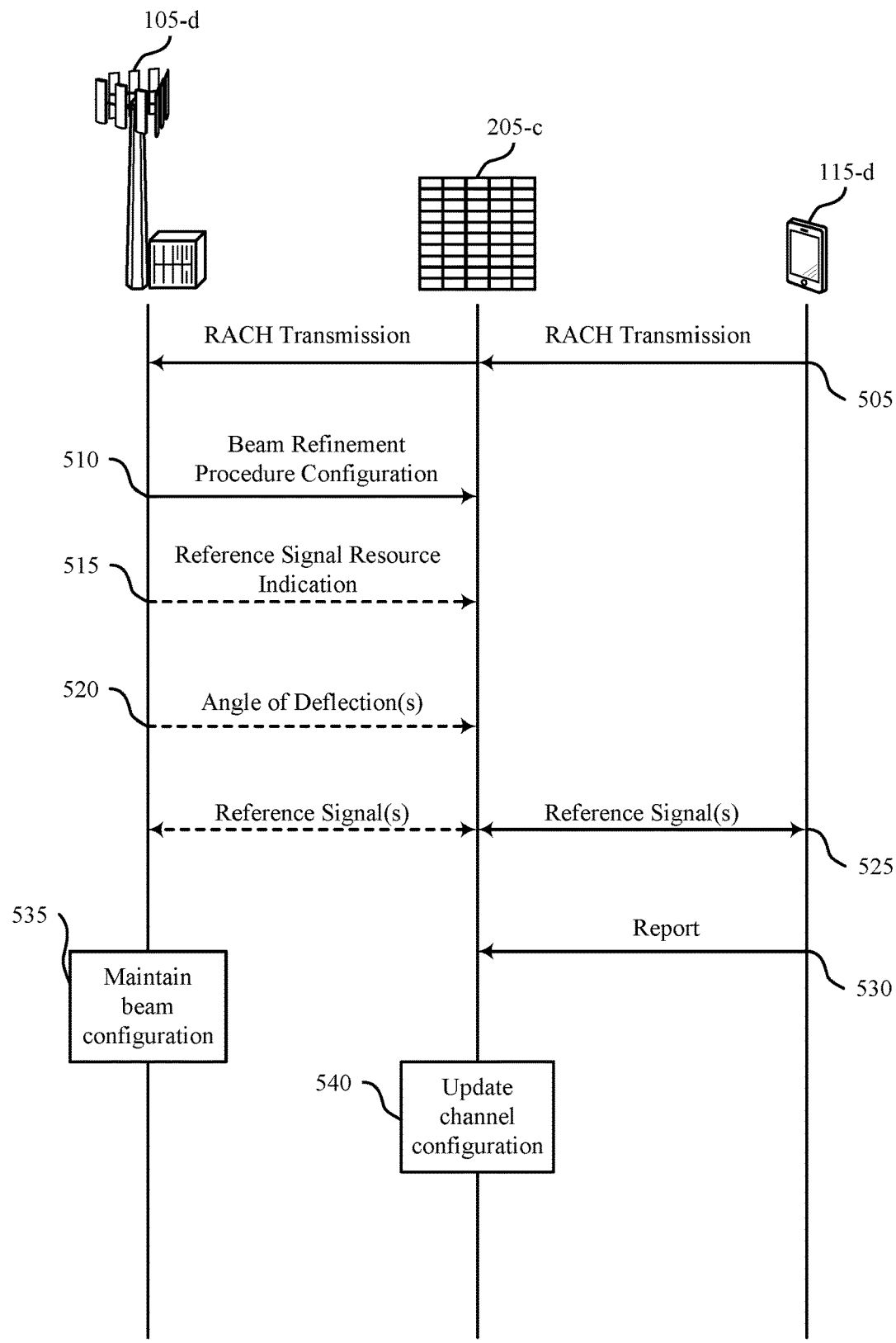

FIG. 5 illustrates an example of a process flow 500 that supports offloading beam tracking using a reflector/refractor in accordance with aspects of the present disclosure. In some examples, process flow 500 may implement aspects of wireless communications systems 100 and/or 200. For instance, base station 105-*d* may be an example of a base station 105 as described with reference to FIG. 1, UE 115-*d* may be an example of a UE 115 as described with reference to FIG. 1 and CED 205-*c* may be an example of a CED 205 as described with reference to FIG. 2.

At 505, UE 115-*d* may transmit, to CED 205-*c*, a RACH transmission. The CED 205-*c* may deflect the RACH transmission to base station 105-*d*. In some examples, base station 105-*d* may receive the RACH transmission using a beam configuration. In some examples, the configuration for performing the downlink beam refinement procedure indicates whether CED 205-*c* is to generate the one or more reference signals at CED 205-*c* or is to receive the one or more reference signals from base station 105-*d*.

At 510, base station 105-*d* may transmit, to the CED 205-*c*, a configuration to enable the CED 205-*c* to perform a downlink beam refinement procedure with UE 115-*d* based on receiving the RACH transmission.

At 515, base station 105-*d* may transmit, to CED 205-*c*, an indication of one or more respective reference signal resources for the one or more reference signals, where CED 205-*c* transmits the one or more reference signals over the one or more respective reference signal resources. In some examples, UE 115-*d* may be located in a first direction from CED 205-*c*. In some such examples, CED 205-*c* may suppress the indication of the one or more respective reference signals from being communicated in the first direction.

At 520, base station 105-*d* may transmit, to CED 205-*c*, an indication of deflection for each of a set of reference signals (e.g., the reference signals transmitted at 525).

At 525, CED 205-*c* may communicate, for the downlink beam refinement procedure, one or more reference signals to UE 115-*d* over one or more beams. In some examples, CED 205-*c* may transmit the one or more reference signals based on the configuration for performing the downlink beam refinement procedure with UE 115-*d*. In some examples, CED 205-*c* may receive the one or more reference signals from base station 105-*d*, where communicating the one or more reference signals to UE 115-*d* may include deflecting the one or more reference signals to UE 115-*d*. In some examples, the one or more reference signals include a set of reference signals. In some examples, CED 205-*c* may communicate via deflecting each of the set of reference signals according to the respective indication of the angle of deflection (e.g., at 520). In some examples, CED 205-*c* may transmit, to base station 105-*d*, a request for the one or more reference signals, where the one or more reference signals are communicated based on the request.

At 530, UE 115-*d* may transmit, to CED 205-*c*, a report based on communicating the one or more reference signals. In some examples, base station 105-*d* may be located in a second direction from CED 205-*c*. In some such examples, CED 205-*c* may suppress the report from being communicated in the second direction. In some examples, the report may indicate a reference signal of the set received with a highest signal strength.

At 535, base station 105-*d* may maintain, after the downlink beam refinement procedure has occurred, the beam configuration based on transmitting the configuration to enable CED 205-*c* to perform the downlink beam refinement procedure with UE 115-*d*.

At 540, CED 205-*c* may update a channel configuration used by CED 205-*c* for communications between base station 105-*d* and UE 115-*d* via CED 205-*c* based on receiving the report. In some examples, CED 205-*c* updating the channel configuration may include CED 205-*c* updating a downlink beam used by CED 205-*c* for communications between UE 115-*d* and base station 105-*d*, an angle of deflection used by CED 205-*c* for communications between UE 115-*d* and base station 105-*d*, or any combination thereof. In some examples, updating the channel configuration may be based on the report indicating the reference signal received with the highest signal strength.

Figure 6:
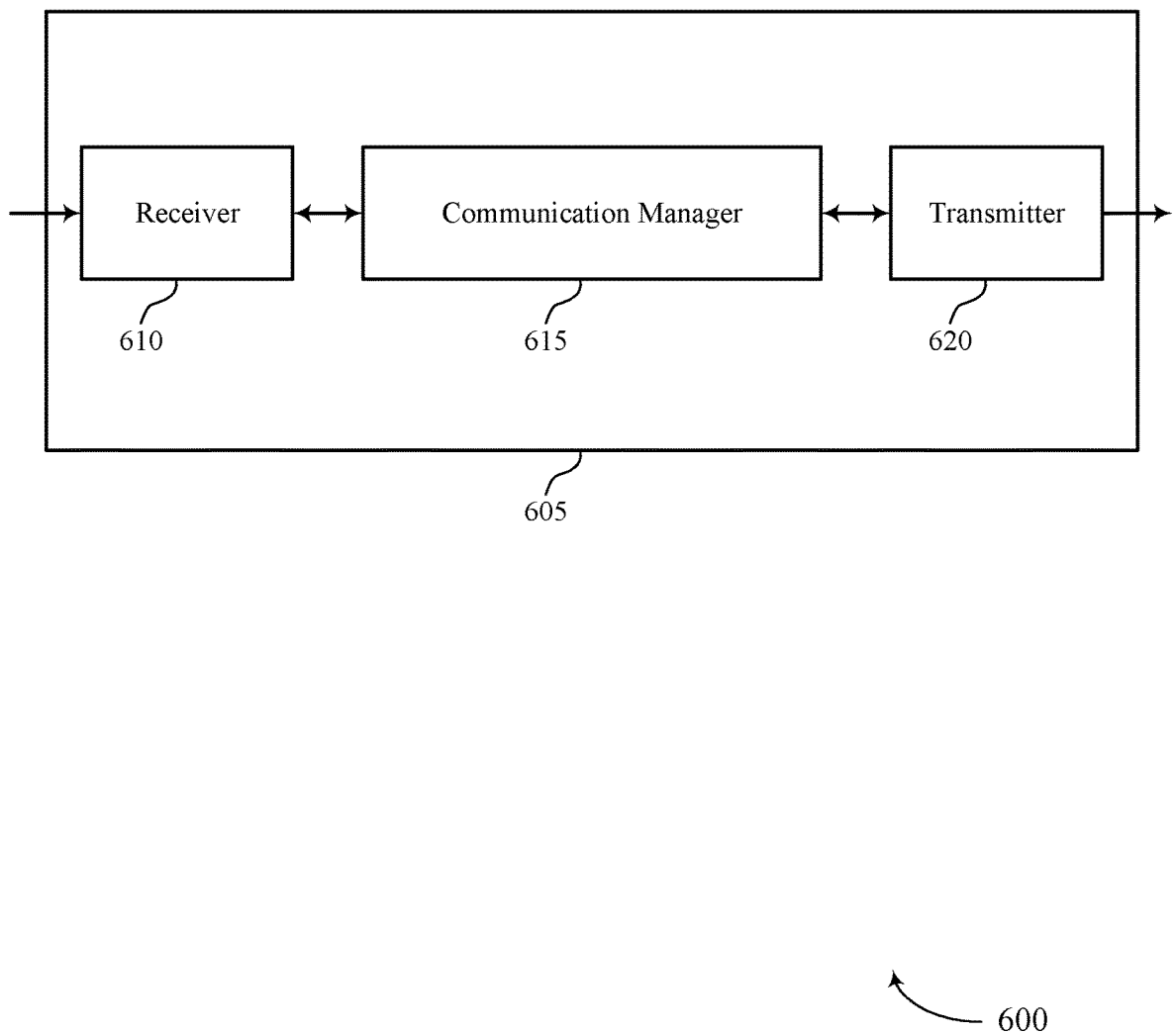
FIGS. 6 and 7 show block diagrams of devices that support offloading beam tracking using a reflector/refractor in accordance with aspects of the present disclosure.

FIG. 6 shows a block diagram 600 of a device 605 that supports offloading beam tracking using a reflector/refractor in accordance with aspects of the present disclosure. The device 605 may be an example of aspects of a CED as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to offloading beam tracking using a reflector/refractor, etc.). Information may be passed on to other components of the device 605. The receiver 610 may be an example of aspects of the transceiver 920 described with reference to FIG. 9. The receiver 610 may utilize a single antenna or a set of antennas.

The communication manager 615 may receive, from a base station, a configuration for performing a downlink beam refinement procedure with a UE; communicate, for the downlink beam refinement procedure, one or more reference signals to the UE over one or more beams; receive, from the UE, a report based on communicating the one or more reference signals; and update a channel configuration used by the channel engineering device for communications between the base station and the UE via the channel engineering device based on receiving the report. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
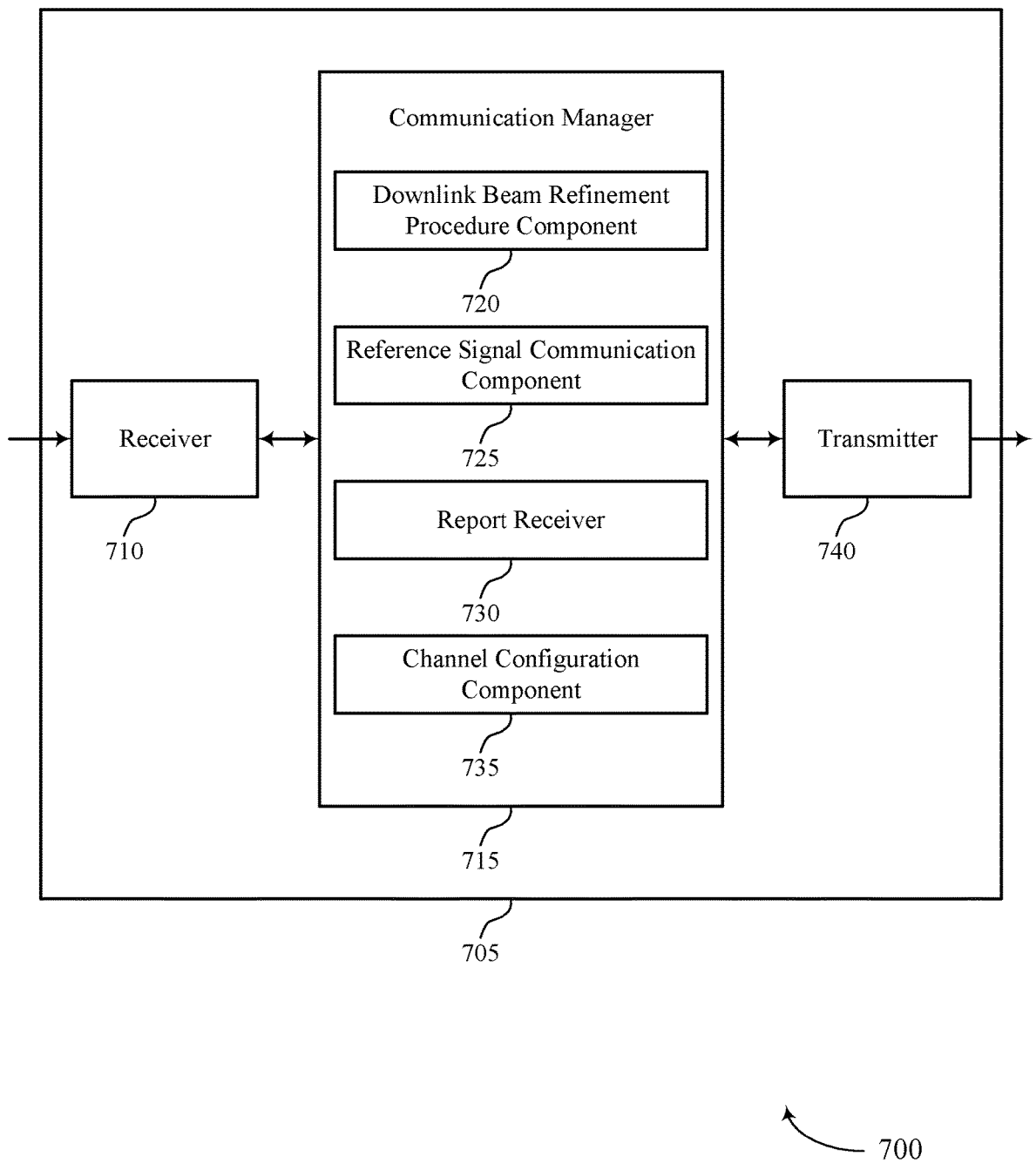

FIG. 7 shows a block diagram 700 of a device 705 that supports offloading beam tracking using a reflector/refractor in accordance with aspects of the present disclosure. The device 705 may be an example of aspects of a device 605, or a CED 205 as described herein. The device 705 may include a receiver 710, a communication manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to offloading beam tracking using a reflector/refractor, etc.). Information may be passed on to other components of the device 705. The receiver 710 may be an example of aspects of the transceiver 920 described with reference to FIG. 9. The receiver 710 may utilize a single antenna or a set of antennas.

The communication manager 715 may be an example of aspects of the communication manager 615 as described herein. The communication manager 715 may include a downlink beam refinement procedure component 720, a reference signal communication component 725, a report receiver 730, and a channel configuration component 735. The communication manager 715 may be an example of aspects of the communication manager 910 described herein.

The downlink beam refinement procedure component 720 may receive, from a base station, a configuration for performing a downlink beam refinement procedure with a UE.

The reference signal communication component 725 may communicate, for the downlink beam refinement procedure, one or more reference signals to the UE over one or more beams.

The report receiver 730 may receive, from the UE, a report based on communicating the one or more reference signals.

The channel configuration component 735 may update a channel configuration used by the channel engineering device for communications between the base station and the UE via the channel engineering device based on receiving the report.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
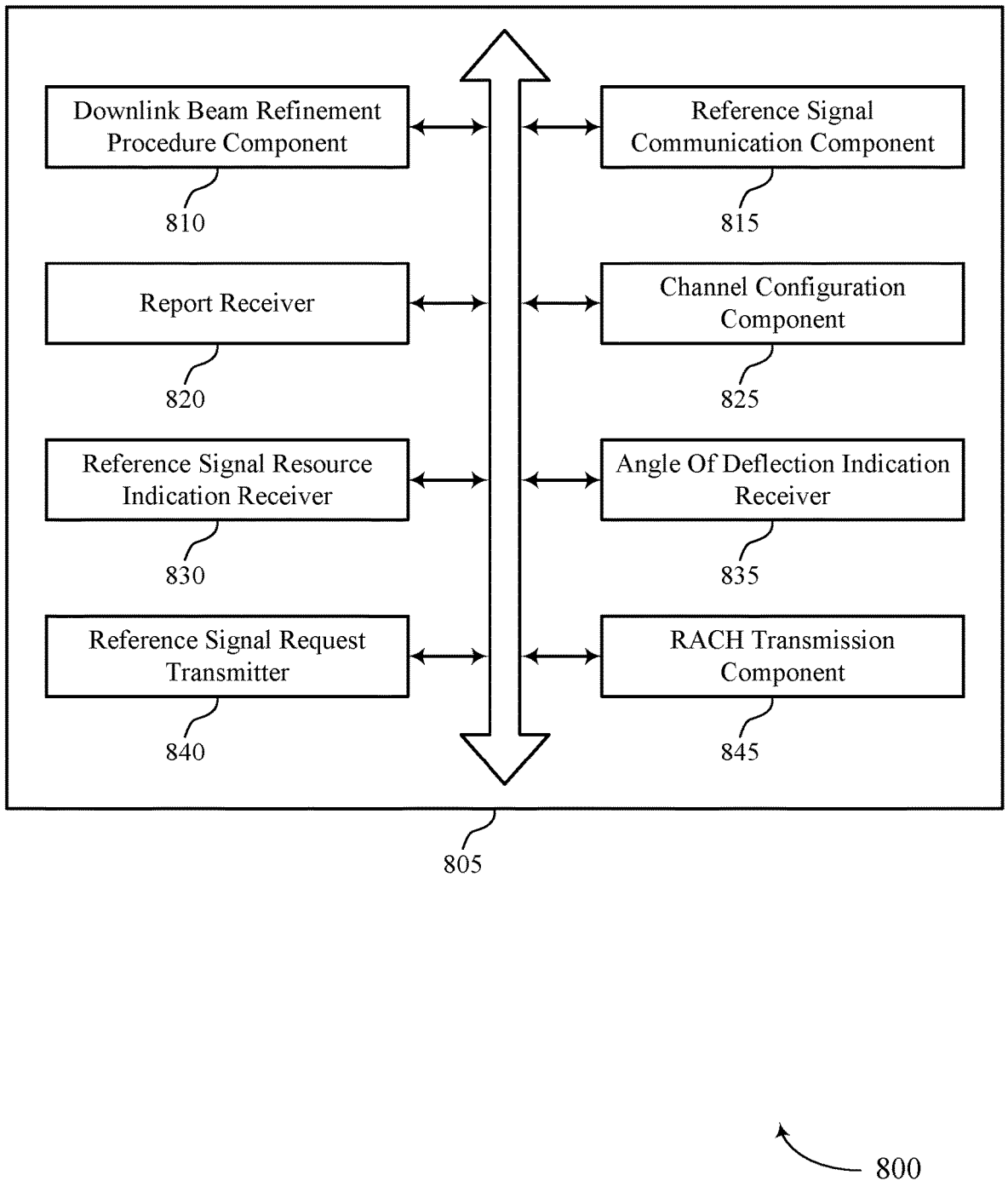
FIG. 8 shows a block diagram of a communication manager that supports offloading beam tracking using a reflector/refractor in accordance with aspects of the present disclosure.

FIG. 8 shows a block diagram 800 of a communication manager 805 that supports offloading beam tracking using a reflector/refractor in accordance with aspects of the present disclosure. The communication manager 805 may be an example of aspects of a communication manager 615, a communication manager 715, or a communication manager 910 described herein. The communication manager 805 may include a downlink beam refinement procedure component 810, a reference signal communication component 815, a report receiver 820, a channel configuration component 825, a reference signal resource indication receiver 830, an angle of deflection indication receiver 835, a reference signal request transmitter 840, and a RACH transmission component 845. Each of these modules may communicate, directly or indirectly, with one another (e.g., via one or more buses).

The downlink beam refinement procedure component 810 may receive, from a base station, a configuration for performing a downlink beam refinement procedure with a UE. In some examples, the configuration for performing the beam refinement procedure indicates whether the channel engineering device is to generate the one or more reference signals at the channel engineering or is to receive the one or more reference signals from the base station.

The reference signal communication component 815 may communicate, for the downlink beam refinement procedure, one or more reference signals to the UE over one or more beams. In some examples, the reference signal communication component 815 may transmit, by the channel engineering device, the one or more reference signals based on the configuration for performing the downlink beam refinement procedure with the UE. In some examples, the reference signal communication component 815 may receive the one or more reference signals from the base station, where communicating the one or more reference signals to the UE includes deflecting the one or more reference signals to the UE. In some examples, the reference signal communication component 815 may communicate via deflecting each of the set of reference signals according to the respective indication of the angle of deflection. In some examples, the one or more reference signals may include a set of reference signals, where the report indicates a reference signal of the set received with a highest signal strength, and where updating the channel configuration is based on the report indicating reference signal received with the highest signal strength.

The report receiver 820 may receive, from the UE, a report based on communicating the one or more reference signals. In some examples, the base station may be located in a first direction from the channel engineering device. In some such examples, the report receiver 820 may suppress the report from being communicated in the first direction.

The channel configuration component 825 may update a channel configuration used by the channel engineering device for communications between the base station and the UE via the channel engineering device based on receiving the report. In some examples, updating the channel configuration includes updating a downlink beam used by the channel engineering device for communications between the UE and the base station, an angle of deflection used by the channel engineering device for communications between the UE and the base station, or any combination thereof.

The reference signal resource indication receiver 830 may receive, from the base station, an indication of one or more respective reference signal resources for the one or more reference signals, where the channel engineering device transmits the one or more reference signals over the one or more respective reference signal resources. In some examples, the UE may be located in a first direction from the channel engineering device. In some such examples, the reference signal resource indication receiver 830 may suppress the indication of the one or more respective reference signal resource from being communicated in the first direction.

In some examples, the one or more reference signals include a set of reference signals. In some such examples, the angle of deflection indication receiver 835 may receive, from the base station, an indication of an angle of deflection for each of the set of reference signals.

The reference signal request transmitter 840 may transmit, to the base station, a request for the one or more reference signals, where the one or more reference signals are communicated based on the request.

The RACH transmission component 845 may receive a random access channel transmission from the UE. In some examples, the RACH transmission component 845 may direct the random access channel transmission via deflection to the base station.

Figure 9:
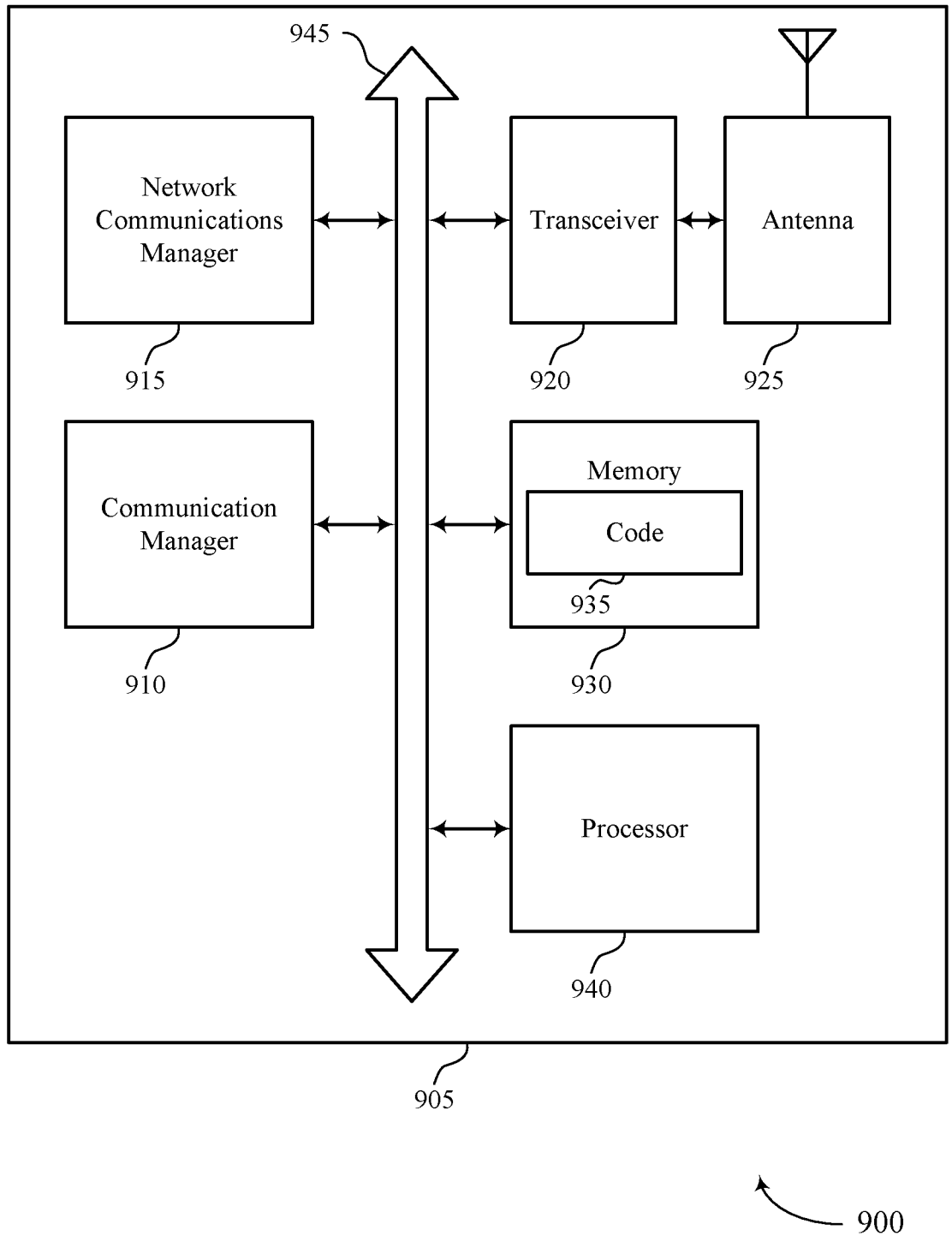
FIG. 9 shows a diagram of a system including a device that supports offloading beam tracking using a reflector/refractor in accordance with aspects of the present disclosure.

FIG. 9 shows a diagram of a system 900 including a device 905 that supports offloading beam tracking using a reflector/refractor in accordance with aspects of the present disclosure. The device 905 may be an example of or include the components of device 605, device 705, or a CED as described herein. The device 905 may include components for bi-directional voice and data communications including components for transmitting and receiving communications, including a communication manager 910, a network communications manager 915, a transceiver 920, an antenna 925, memory 930, and a processor 940. These components may be in electronic communication via one or more buses (e.g., bus 945).

The communication manager 910 may receive, from a base station, a configuration for performing a downlink beam refinement procedure with a UE, communicate; for the downlink beam refinement procedure, one or more reference signals to the UE over one or more beams; receive, from the UE, a report based on communicating the one or more reference signals; and update a channel configuration used by the channel engineering device for communications between the base station and the UE via the channel engineering device based on receiving the report.

The network communications manager 915 may manage communications with the core network (e.g., via one or more wired backhaul links). For example, the network communications manager 915 may manage the transfer of data communications for client devices, such as one or more UEs 115.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting offloading beam tracking using a reflector/refractor).

Figure 10:
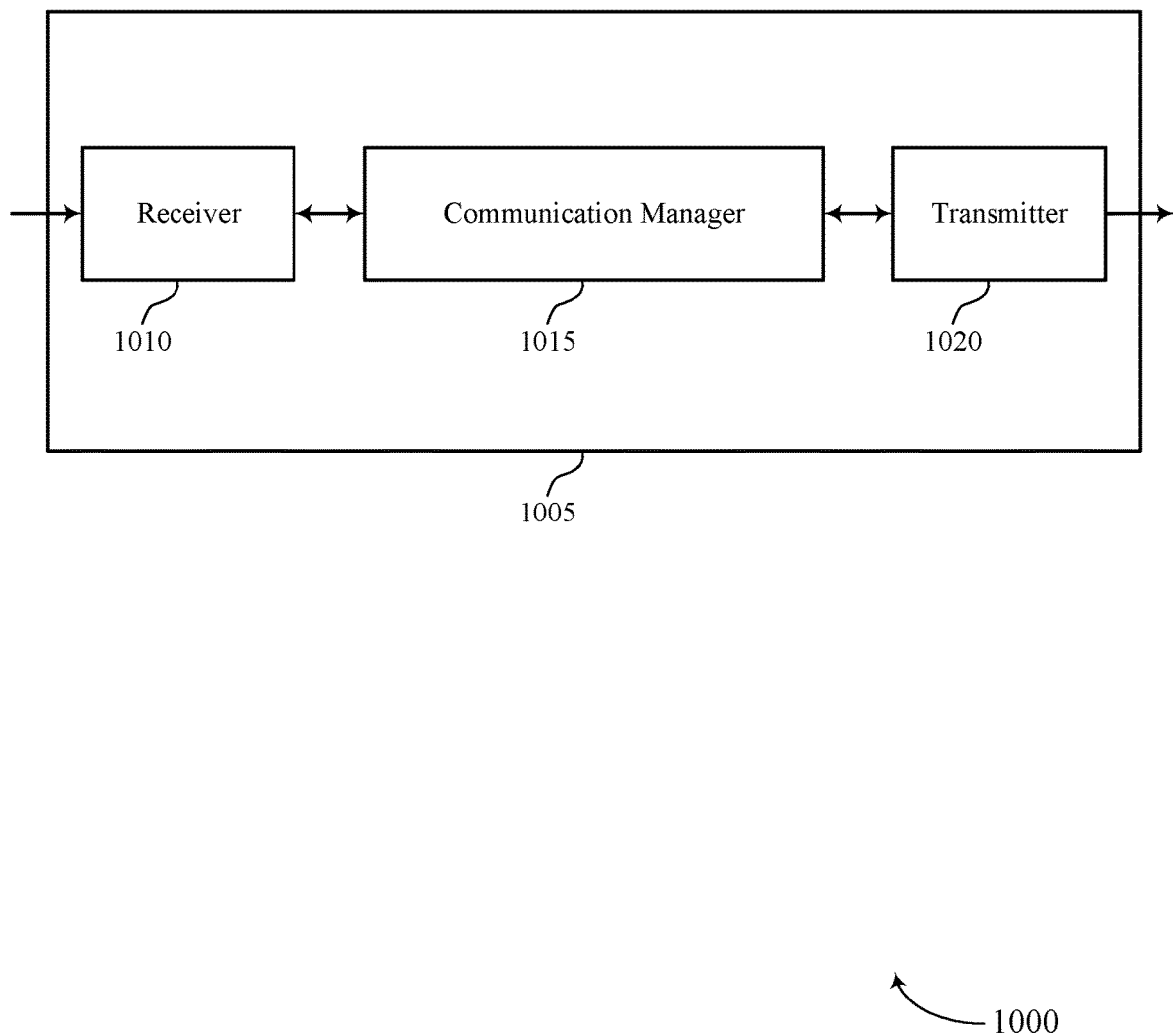
FIGS. 10 and 11 show block diagrams of devices that support offloading beam tracking using a reflector/refractor in accordance with aspects of the present disclosure.

FIG. 10 shows a block diagram 1000 of a device 1005 that supports offloading beam tracking using a reflector/refractor in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to offloading beam tracking using a reflector/refractor, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may receive, using a beam configuration for communicating with a UE via a channel engineering device, a random access channel transmission from the UE that is deflected by the channel engineering device; transmit, to the channel engineering device, a configuration to enable the channel engineering device to perform a downlink beam refinement procedure with a UE based on receiving the random access channel transmission; and maintain, after the downlink beam refinement procedure has occurred, the beam configuration based on transmitting the configuration to enable the channel engineering device to perform the downlink beam refinement procedure with the UE. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
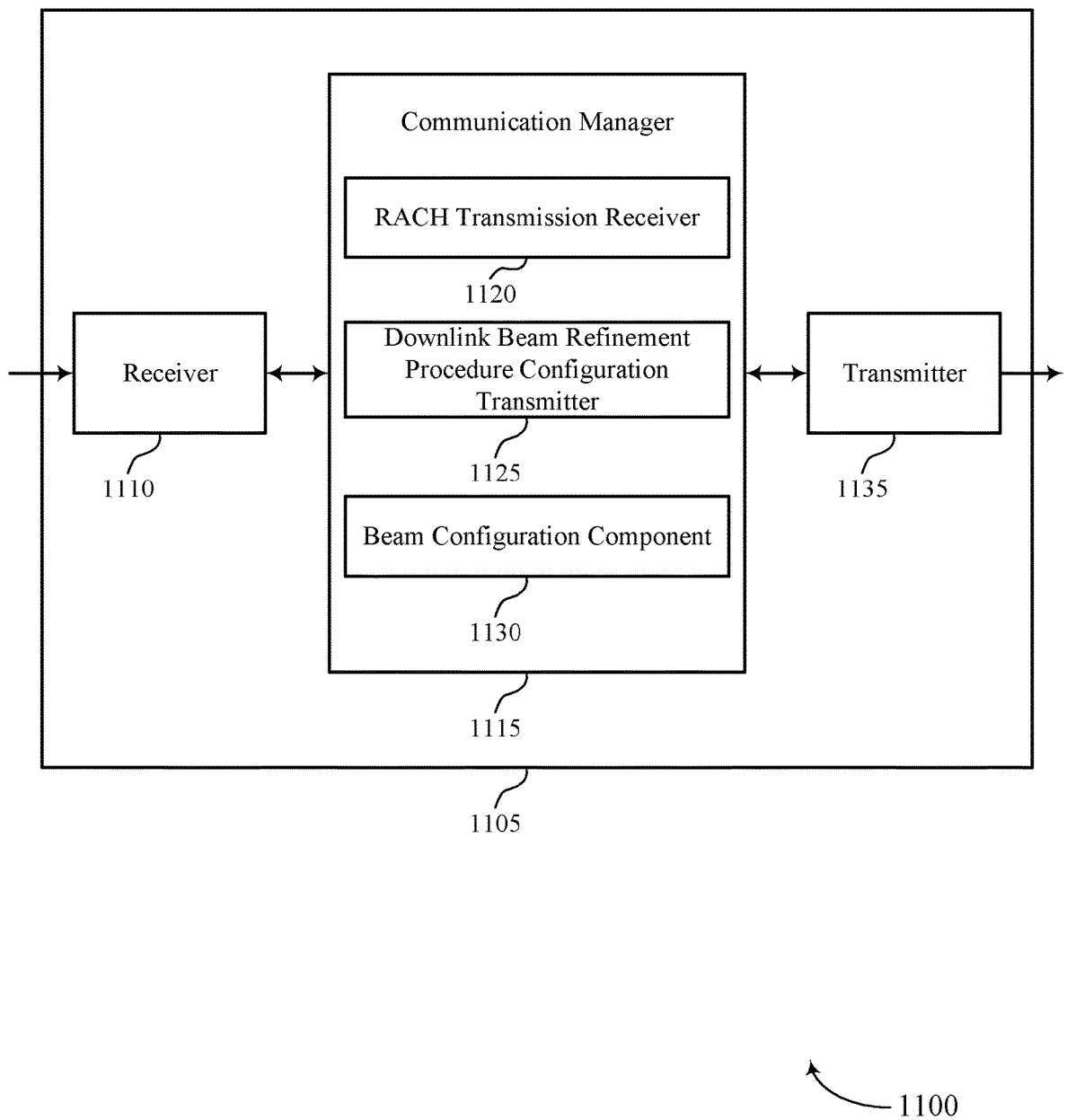

FIG. 11 shows a block diagram 1100 of a device 1105 that supports offloading beam tracking using a reflector/refractor in accordance with aspects of the present disclosure. The device 1105 may be an example of aspects of a device 1005, or a base station 105 as described herein. The device 1105 may include a receiver 1110, a communication manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to offloading beam tracking using a reflector/refractor, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a RACH transmission receiver 1120, a downlink beam refinement procedure configuration transmitter 1125, and a beam configuration component 1130. The communication manager 1115 may be an example of aspects of the communication manager 1310 described herein.

The RACH transmission receiver 1120 may receive, using a beam configuration for communicating with a UE via a channel engineering device, a random access channel transmission from the UE that is deflected by the channel engineering device.

The downlink beam refinement procedure configuration transmitter 1125 may transmit, to the channel engineering device, a configuration to enable the channel engineering device to perform a downlink beam refinement procedure with a UE based on receiving the random access channel transmission.

The beam configuration component 1130 may maintain, after the downlink beam refinement procedure has occurred, the beam configuration based on transmitting the configuration to enable the channel engineering device to perform the downlink beam refinement procedure with the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
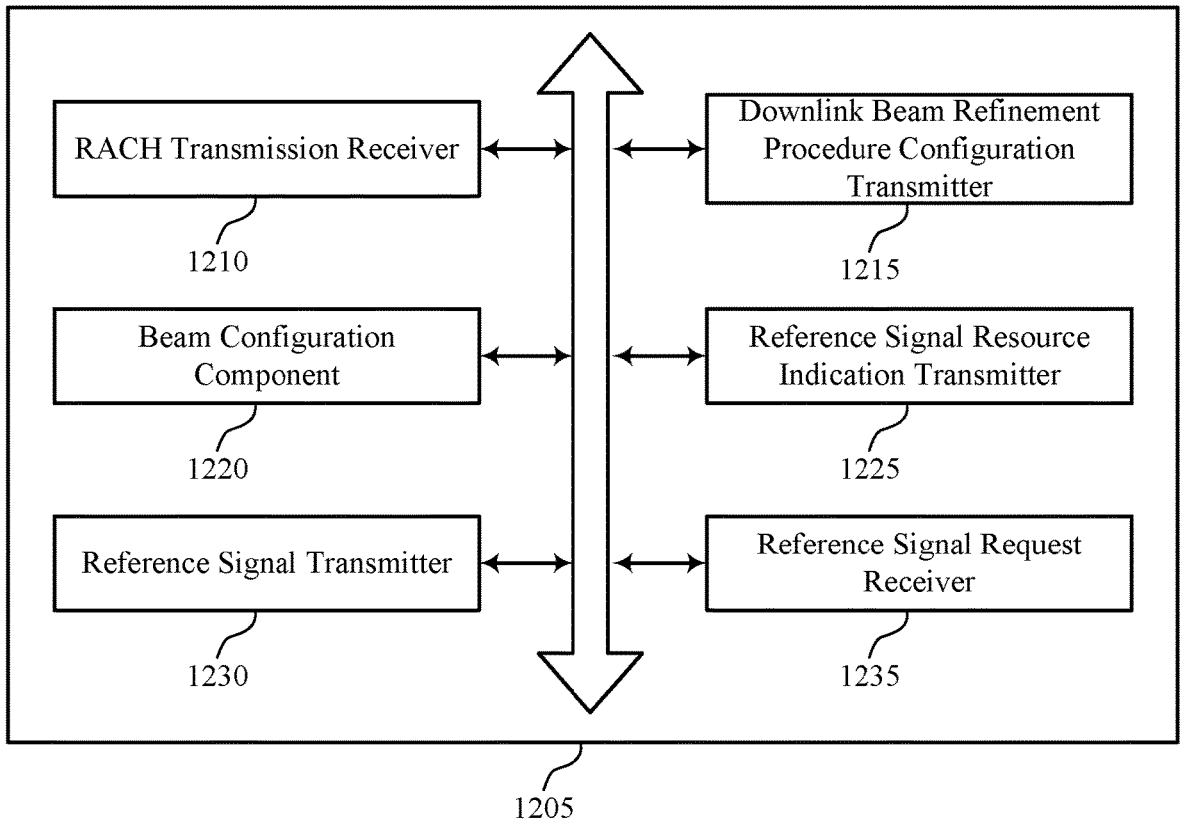
FIG. 12 shows a block diagram of a communication manager that supports offloading beam tracking using a reflector/refractor in accordance with aspects of the present disclosure.

FIG. 12 shows a block diagram 1200 of a communication manager 1205 that supports offloading beam tracking using a reflector/refractor in accordance with aspects of the present disclosure. The communication manager 1205 may be an example of aspects of a communication manager 1015, a communication manager 1115, or a communication manager 1310 described herein. The communication manager 1205 may include a RACH transmission receiver 1210, a downlink beam refinement procedure configuration transmitter 1215, a beam configuration component 1220, a reference signal resource indication transmitter 1225, a reference signal transmitter 1230, and a reference signal request receiver 1235. Each of these modules may communicate, directly or indirectly, with one another (e.g., via one or more buses).

The RACH transmission receiver 1210 may receive, using a beam configuration for communicating with a UE via a channel engineering device, a random access channel transmission from the UE that is deflected by the channel engineering device.

The downlink beam refinement procedure configuration transmitter 1215 may transmit, to the channel engineering device, a configuration to enable the channel engineering device to perform a downlink beam refinement procedure with a UE based on receiving the random access channel transmission. In some examples, the configuration for performing the downlink beam refinement procedure indicates whether the channel engineering device is to generate the one or more reference signals at the channel engineering device or is to receive the one or more reference signals from the base station.

The beam configuration component 1220 may maintain, after the downlink beam refinement procedure has occurred, the beam configuration based on transmitting the configuration to enable the channel engineering device to perform the downlink beam refinement procedure with the UE.

The reference signal resource indication transmitter 1225 may transmit, to the channel engineering device, an indication of one or more reference signal resources over which the channel engineering device is to transmit one or more reference signals. In some examples, the configuration to enable the channel engineering device to perform the downlink beam refinement procedure indicates to the channel engineering device to transmit the one or more reference signals by the channel engineering device.

The reference signal transmitter 1230 may transmit one or more reference signals to the channel engineering device for deflection to the UE. In some examples, the one or more reference signals include a set of reference signals, and the reference signal transmitter 1230 may transmit, to the channel engineering device, an indication of an angle of deflection for each of the set of reference signals. In some examples, the reference signal transmitter 1230 may transmit each of the set of reference signals using the beam configuration, where at least one of the set of reference signals is associated with a different angle of deflection from another of the set of reference signals.

The reference signal request receiver 1235 may receive, from the channel engineering device, a request for the one or more reference signals, where the one or more reference signals are transmitted based on the request.

Figure 13:
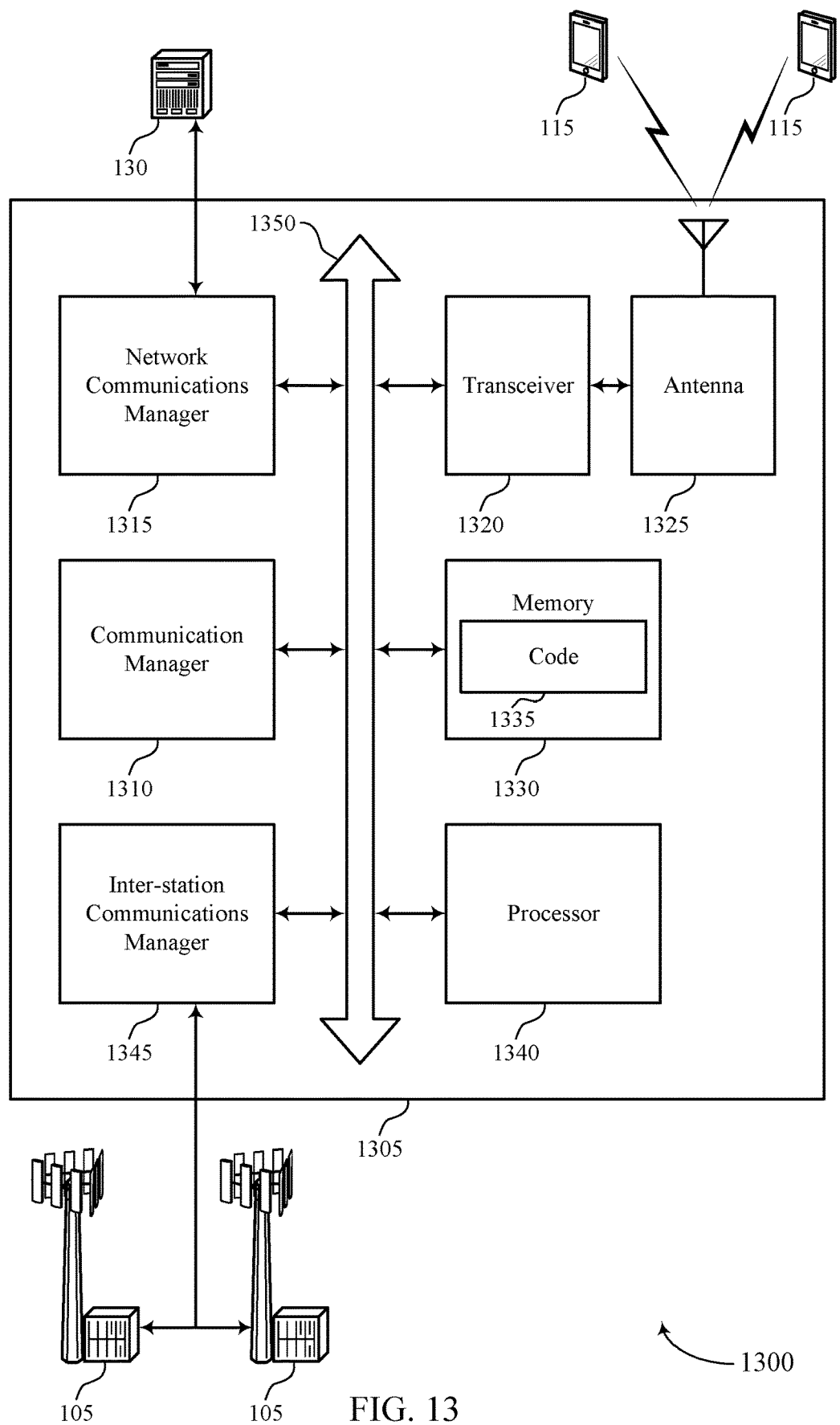
FIG. 13 shows a diagram of a system including a device that supports offloading beam tracking using a reflector/refractor in accordance with aspects of the present disclosure.

FIG. 13 shows a diagram of a system 1300 including a device 1305 that supports offloading beam tracking using a reflector/refractor in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may receive, using a beam configuration for communicating with a UE via a channel engineering device, a random access channel transmission from the UE that is deflected by the channel engineering device; transmit, to the channel engineering device, a configuration to enable the channel engineering device to perform a downlink beam refinement procedure with a UE based on receiving the random access channel transmission; and maintain, after the downlink beam refinement procedure has occurred, the beam configuration based on transmitting the configuration to enable the channel engineering device to perform the downlink beam refinement procedure with the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting offloading beam tracking using a reflector/refractor).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
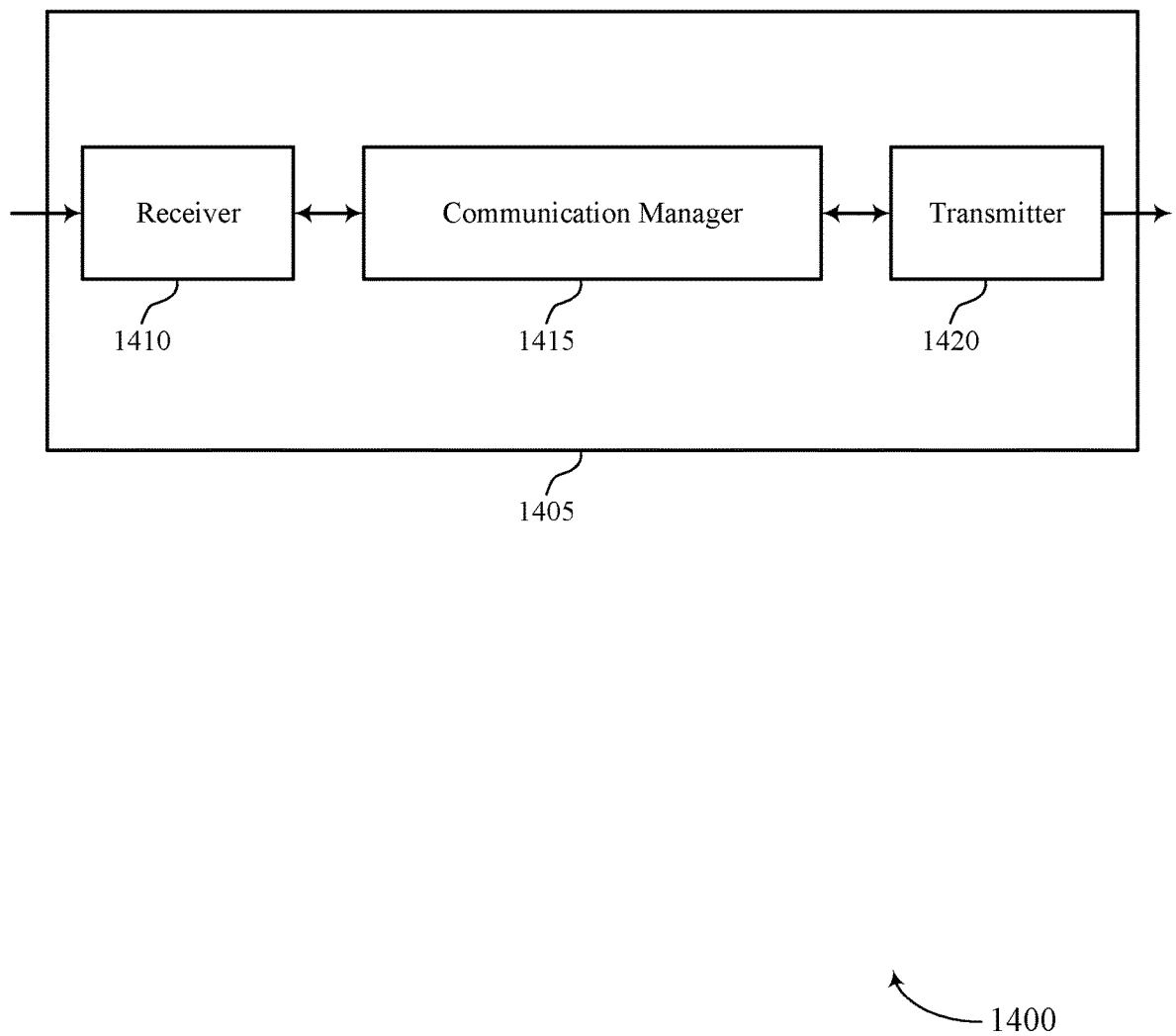
FIGS. 14 and 15 show block diagrams of devices that support offloading beam tracking using a reflector/refractor in accordance with aspects of the present disclosure.

FIG. 14 shows a block diagram 1400 of a device 1405 that supports offloading beam tracking using a reflector/refractor in accordance with aspects of the present disclosure. The device 1405 may be an example of aspects of a UE 115 as described herein. The device 1405 may include a receiver 1410, a communication manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to offloading beam tracking using a reflector/refractor, etc.). Information may be passed on to other components of the device 1405. The receiver 1410 may be an example of aspects of the transceiver 1715 described with reference to FIG. 17. The receiver 1410 may utilize a single antenna or a set of antennas.

The communication manager 1415 may transmit, to a base station via deflection by a channel engineering device, a random access channel transmission; receive, from the channel engineering device, one or more reference signals as part of a downlink beam refinement procedure based on transmitting the random access channel transmission to the base station; and transmit, to the channel engineering device, a report based on receiving the one or more reference signals. The communication manager 1415 may be an example of aspects of the communication manager 1710 described herein.

The communication manager 1415, or its sub-components, may be implemented in hardware, code (e.g., software or firmware) executed by a processor, or any combination thereof. If implemented in code executed by a processor, the functions of the communication manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1415, or its sub-components, may be physically located at various positions, including being distributed such that portions of functions are implemented at different physical locations by one or more physical components. In some examples, the communication manager 1415, or its sub-components, may be a separate and distinct component in accordance with various aspects of the present disclosure. In some examples, the communication manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1715 described with reference to FIG. 17. The transmitter 1420 may utilize a single antenna or a set of antennas.

Figure 15:
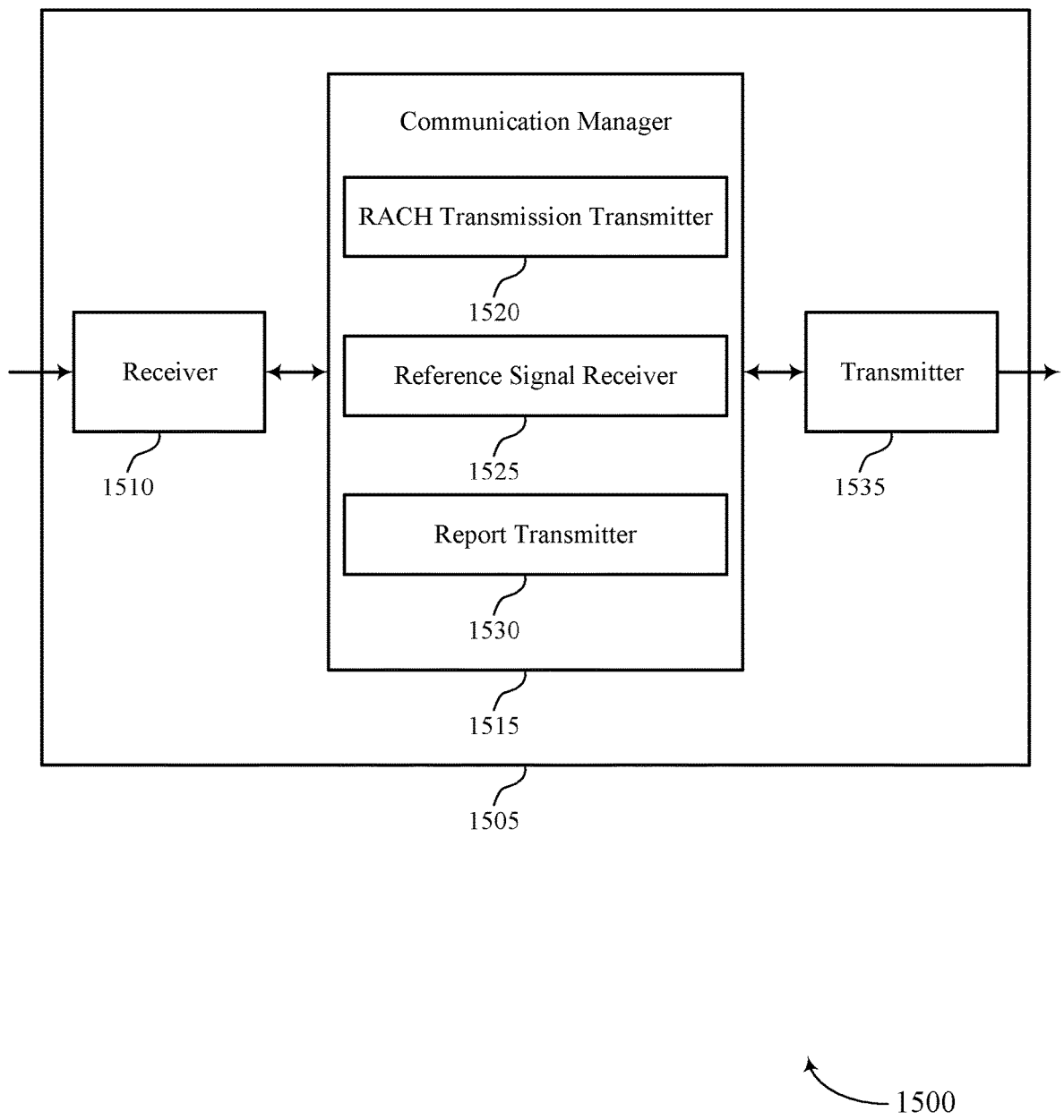

FIG. 15 shows a block diagram 1500 of a device 1505 that supports offloading beam tracking using a reflector/refractor in accordance with aspects of the present disclosure. The device 1505 may be an example of aspects of a device 1405, or a UE 115 as described herein. The device 1505 may include a receiver 1510, a communication manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to offloading beam tracking using a reflector/refractor, etc.). Information may be passed on to other components of the device 1505. The receiver 1510 may be an example of aspects of the transceiver 1715 described with reference to FIG. 17. The receiver 1510 may utilize a single antenna or a set of antennas.

The communication manager 1515 may be an example of aspects of the communication manager 1415 as described herein. The communication manager 1515 may include a RACH transmission transmitter 1520, a reference signal receiver 1525, and a report transmitter 1530. The communication manager 1515 may be an example of aspects of the communication manager 1710 described herein.

The RACH transmission transmitter 1520 may transmit, to a base station via deflection by a channel engineering device, a random access channel transmission.

The reference signal receiver 1525 may receive, from the channel engineering device, one or more reference signals as part of a downlink beam refinement procedure based on transmitting the random access channel transmission to the base station.

The report transmitter 1530 may transmit, to the channel engineering device, a report based on receiving the one or more reference signals.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1715 described with reference to FIG. 17. The transmitter 1535 may utilize a single antenna or a set of antennas.

Figure 16:
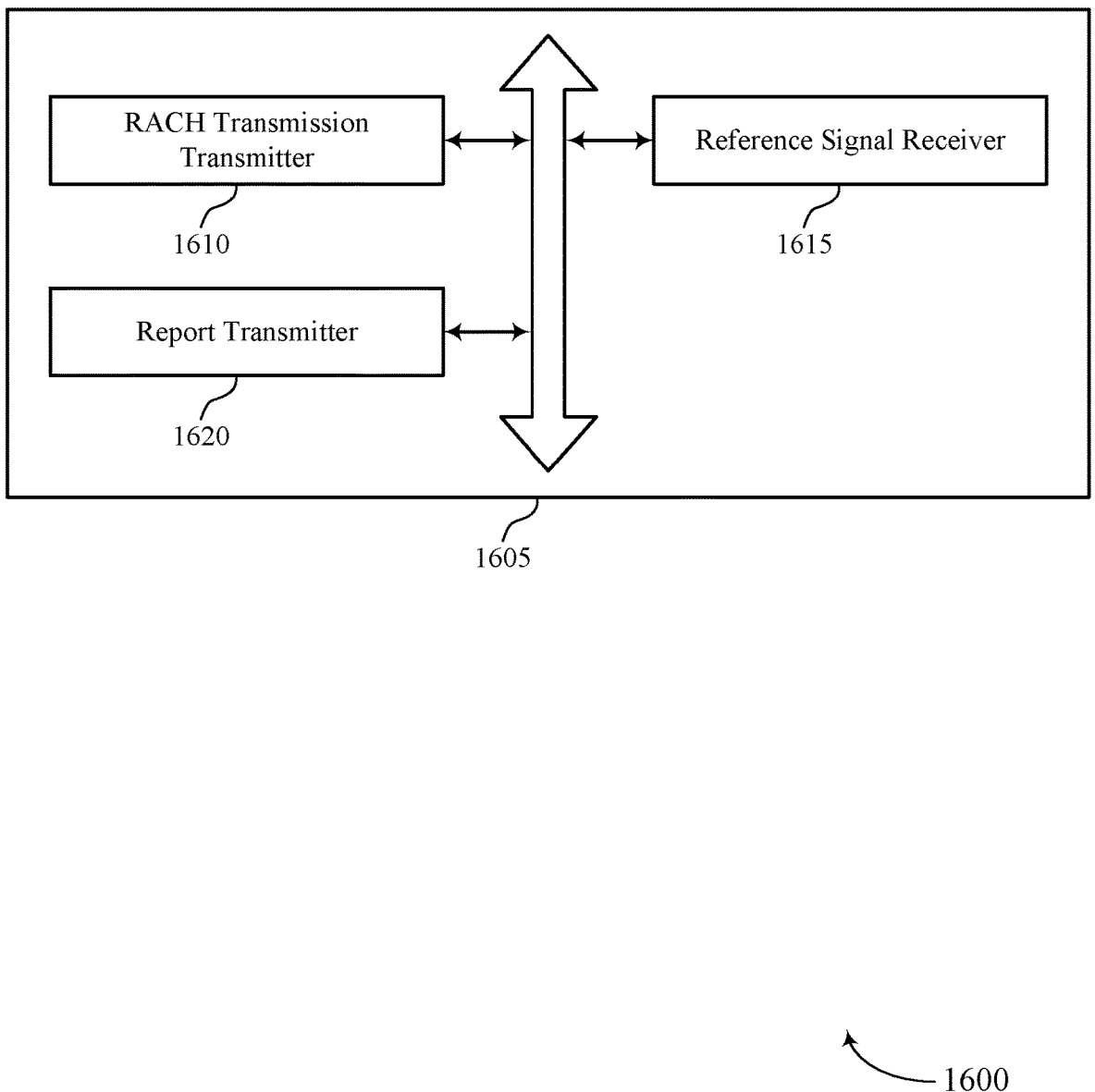
FIG. 16 shows a block diagram of a communication manager that supports offloading beam tracking using a reflector/refractor in accordance with aspects of the present disclosure.

FIG. 16 shows a block diagram 1600 of a communication manager 1605 that supports offloading beam tracking using a reflector/refractor in accordance with aspects of the present disclosure. The communication manager 1605 may be an example of aspects of a communication manager 1415, a communication manager 1515, or a communication manager 1710 described herein. The communication manager 1605 may include a RACH transmission transmitter 1610, a reference signal receiver 1615, and a report transmitter 1620. Each of these modules may communicate, directly or indirectly, with one another (e.g., via one or more buses).

The RACH transmission transmitter 1610 may transmit, to a base station via deflection by a channel engineering device, a random access channel transmission.

The reference signal receiver 1615 may receive, from the channel engineering device, one or more reference signals as part of a downlink beam refinement procedure based on transmitting the random access channel transmission to the base station. In some examples, receiving the one or more reference signals includes receiving the one or more reference signals transmitted by the channel engineering device. In some examples, receiving the one or more reference signals includes receiving the one or more reference signals transmitted from the base station and deflected by the channel engineering device. In some examples, the one or more reference signals include a set of reference signals, where the report indicates a reference signal of the set received with a highest signal strength.

The report transmitter 1620 may transmit, to the channel engineering device, a report based on receiving the one or more reference signals.

Figure 17:
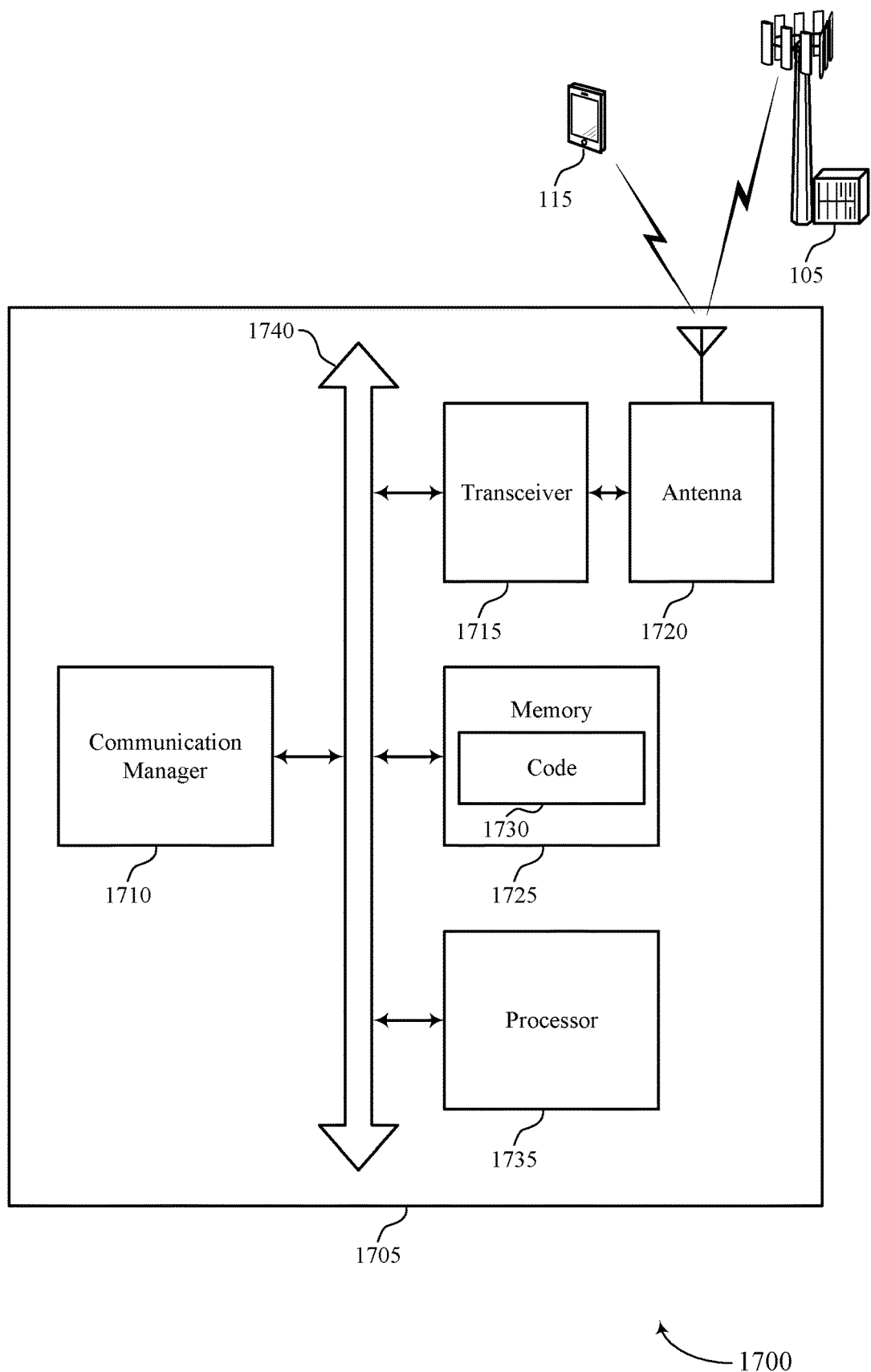
FIG. 17 shows a diagram of a system including a device that supports offloading beam tracking using a reflector/refractor in accordance with aspects of the present disclosure.

FIG. 17 shows a diagram of a system 1700 including a device 1705 that supports offloading beam tracking using a reflector/refractor in accordance with aspects of the present disclosure. The device 1705 may be an example of or include the components of device 1405, device 1505, or a UE 115 as described herein. The device 1705 may include components for bi-directional voice and data communications including components for transmitting and receiving communications, including a communication manager 1710, a transceiver 1715, an antenna 1720, memory 1725, and a processor 1735. These components may be in electronic communication via one or more buses (e.g., bus 1740).

The communication manager 1710 may transmit, to a base station via deflection by a channel engineering device, a random access channel transmission; receive, from the channel engineering device, one or more reference signals as part of a downlink beam refinement procedure based on transmitting the random access channel transmission to the base station; and transmit, to the channel engineering device, a report based on receiving the one or more reference signals.

The transceiver 1715 may communicate bi-directionally, via one or more antennas, wired, or wireless links as described above. For example, the transceiver 1715 may represent a wireless transceiver and may communicate bi-directionally with another wireless transceiver. The transceiver 1715 may also include a modem to modulate the packets and provide the modulated packets to the antennas for transmission, and to demodulate packets received from the antennas.

In some cases, the wireless device may include a single antenna 1720. However, in some cases the device may have more than one antenna 1720, which may be capable of concurrently transmitting or receiving multiple wireless transmissions.

The memory 1725 may include RAM and ROM. The memory 1725 may store computer-readable, computer-executable code 1730 including instructions that, when executed, cause the processor to perform various functions described herein. In some cases, the memory 1725 may contain, among other things, a BIOS which may control basic hardware or software operation such as the interaction with peripheral components or devices.

The code 1730 may include instructions to implement aspects of the present disclosure, including instructions to support wireless communications. The code 1730 may be stored in a non-transitory computer-readable medium such as system memory or other type of memory. In some cases, the code 1730 may not be directly executable by the processor 1735 but may cause a computer (e.g., when compiled and executed) to perform functions described herein.

The processor 1735 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1735 may be configured to operate a memory array using a memory controller. In other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting offloading beam tracking using a reflector/refractor).

Figure 18:
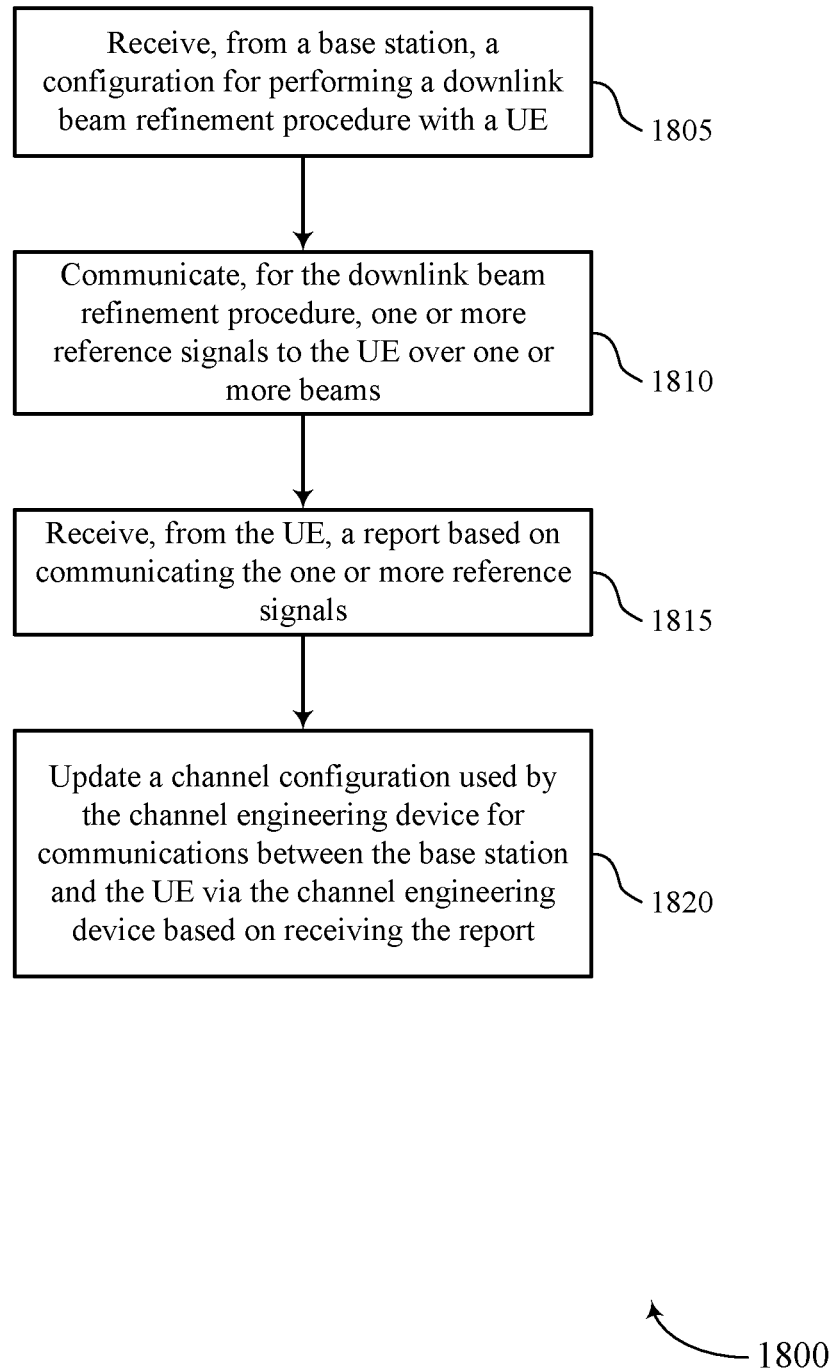
FIGS. 18 through 22 show flowcharts illustrating methods that support offloading beam tracking using a reflector/refractor in accordance with aspects of the present disclosure.

FIG. 18 shows a flowchart illustrating a method 1800 that supports offloading beam tracking using a reflector/refractor in accordance with aspects of the present disclosure. The operations of method 1800 may be implemented by a CED or its components as described herein. For example, the operations of method 1800 may be performed by a communication manager as described with reference to FIGS. 6 through 9. In some examples, a CED may execute a set of instructions to control the functional elements of the CED to perform the described functions. Additionally or alternatively, a CED may perform aspects of the described functions using special-purpose hardware.

At 1805, the CED may receive, from a base station, a configuration for performing a downlink beam refinement procedure with a UE. The operations of 1805 may be performed according to the methods described herein. In some examples, aspects of the operations of 1805 may be performed by a downlink beam refinement procedure component as described with reference to FIGS. 6 through 9.

At 1810, the CED may communicate, for the downlink beam refinement procedure, one or more reference signals to the UE over one or more beams. The operations of 1810 may be performed according to the methods described herein. In some examples, aspects of the operations of 1810 may be performed by a reference signal communication component as described with reference to FIGS. 6 through 9.

At 1815, the CED may receive, from the UE, a report based on communicating the one or more reference signals. The operations of 1815 may be performed according to the methods described herein. In some examples, aspects of the operations of 1815 may be performed by a report receiver as described with reference to FIGS. 6 through 9.

At 1820, the CED may update a channel configuration used by the channel engineering device for communications between the base station and the UE via the channel engineering device based on receiving the report. The operations of 1820 may be performed according to the methods described herein. In some examples, aspects of the operations of 1820 may be performed by a channel configuration component as described with reference to FIGS. 6 through 9.

Figure 19:
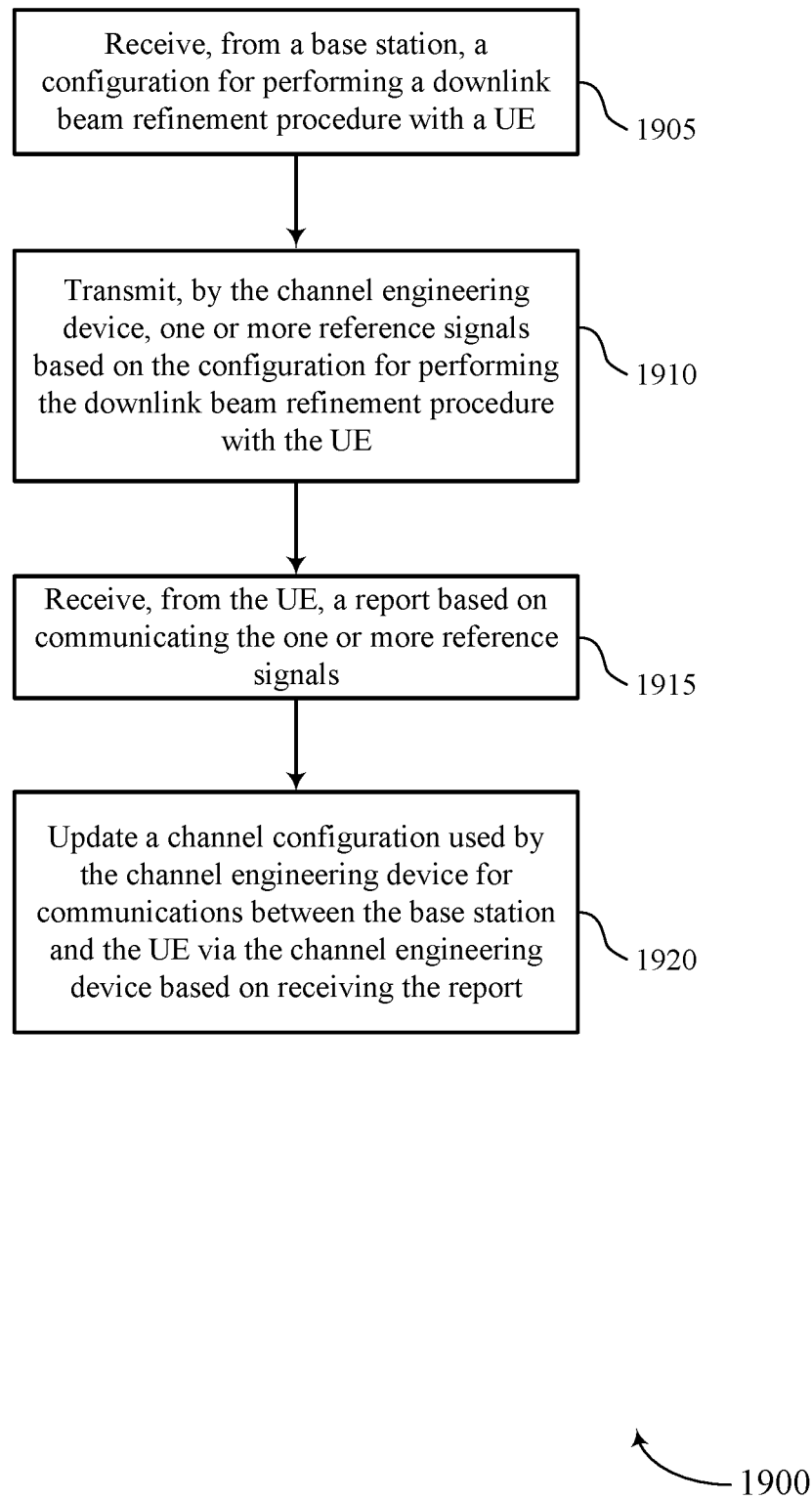

FIG. 19 shows a flowchart illustrating a method 1900 that supports offloading beam tracking using a reflector/refractor in accordance with aspects of the present disclosure. The operations of method 1900 may be implemented by a CED or its components as described herein. For example, the operations of method 1900 may be performed by a communication manager as described with reference to FIGS. 6 through 9. In some examples, a CED may execute a set of instructions to control the functional elements of the CED to perform the described functions. Additionally or alternatively, a CED may perform aspects of the described functions using special-purpose hardware.

At 1905, the CED may receive, from a base station, a configuration for performing a downlink beam refinement procedure with a UE. The operations of 1905 may be performed according to the methods described herein. In some examples, aspects of the operations of 1905 may be performed by a downlink beam refinement procedure component as described with reference to FIGS. 6 through 9.

At 1910, the CED may transmit one or more reference signals based on the configuration for performing the downlink beam refinement procedure with the UE. The operations of 1910 may be performed according to the methods described herein. In some examples, aspects of the operations of 1910 may be performed by a reference signal communication component as described with reference to FIGS. 6 through 9.

At 1915, the CED may receive, from the UE, a report based on communicating the one or more reference signals. The operations of 1915 may be performed according to the methods described herein. In some examples, aspects of the operations of 1915 may be performed by a report receiver as described with reference to FIGS. 6 through 9.

At 1920, the CED may update a channel configuration used by the channel engineering device for communications between the base station and the UE via the channel engineering device based on receiving the report. The operations of 1920 may be performed according to the methods described herein. In some examples, aspects of the operations of 1920 may be performed by a channel configuration component as described with reference to FIGS. 6 through 9.

At 1925, the CED may transmit, by the channel engineering device, the one or more reference signals based on the configuration for performing the downlink beam refinement procedure with the UE. The operations of 1925 may be performed according to the methods described herein. In some examples, aspects of the operations of 1925 may be performed by a reference signal communication component as described with reference to FIGS. 6 through 9.

Figure 20:
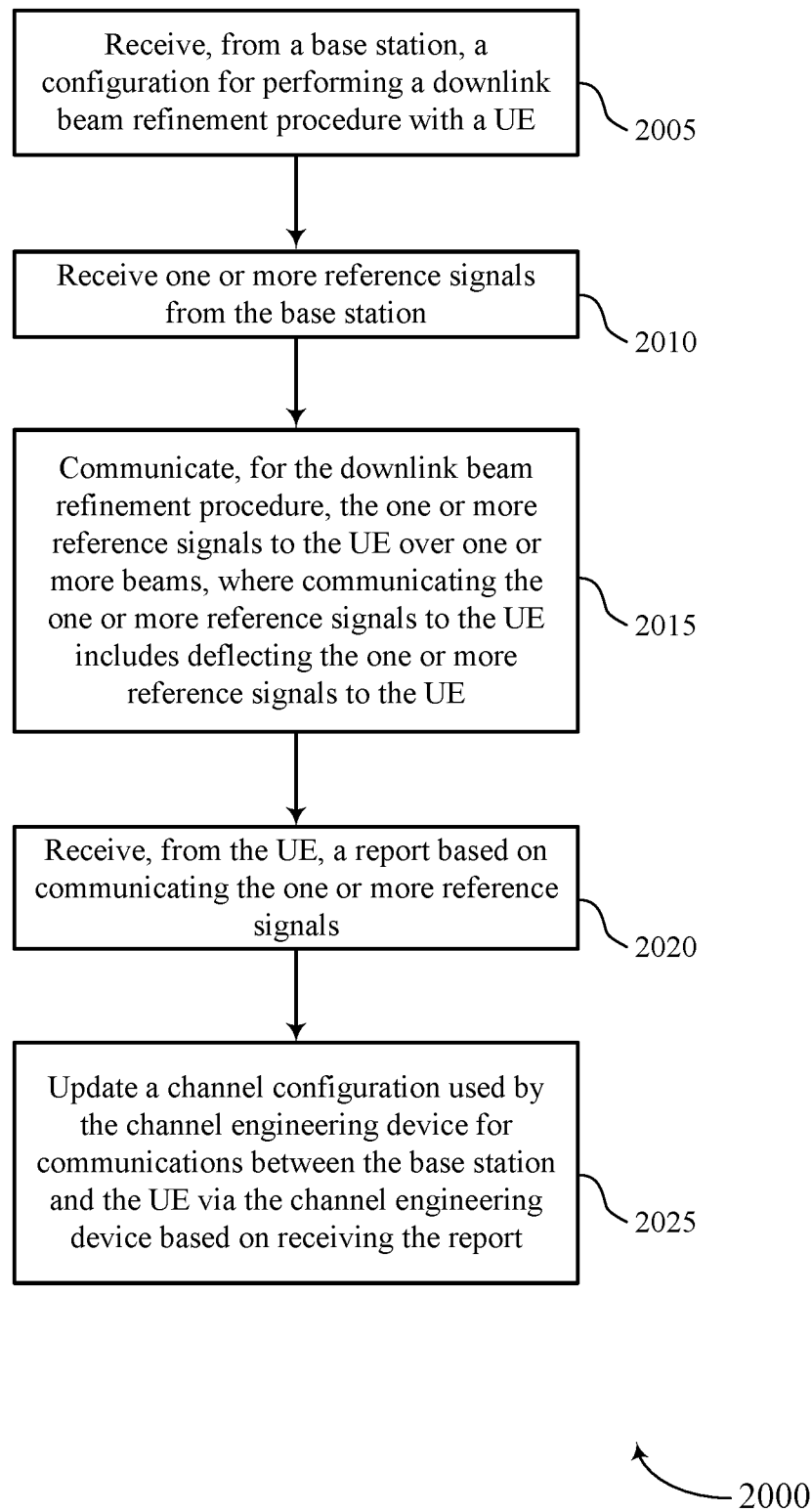

FIG. 20 shows a flowchart illustrating a method 2000 that supports offloading beam tracking using a reflector/refractor in accordance with aspects of the present disclosure. The operations of method 2000 may be implemented by a CED or its components as described herein. For example, the operations of method 2000 may be performed by a communication manager as described with reference to FIGS. 6 through 9. In some examples, a CED may execute a set of instructions to control the functional elements of the CED to perform the described functions. Additionally or alternatively, a CED may perform aspects of the described functions using special-purpose hardware.

At 2005, the CED may receive, from a base station, a configuration for performing a downlink beam refinement procedure with a UE. The operations of 2005 may be performed according to the methods described herein. In some examples, aspects of the operations of 2005 may be performed by a downlink beam refinement procedure component as described with reference to FIGS. 6 through 9.

At 2010, the CED may receive one or more reference signals from the base station. The operations of 2010 may be performed according to the methods described herein. In some examples, aspects of the operations of 2010 may be performed by a reference signal communication component as described with reference to FIGS. 6 through 9.

At 2015, the CED may communicate, for the downlink beam refinement procedure, the one or more reference signals to the UE over one or more beams, where communicating the one or more reference signals to the UE includes deflecting the one or more reference signals to the UE. The operations of 2015 may be performed according to the methods described herein. In some examples, aspects of the operations of 2015 may be performed by a reference signal communication component as described with reference to FIGS. 6 through 9.

At 2020, the CED may receive, from the UE, a report based on communicating the one or more reference signals. The operations of 2020 may be performed according to the methods described herein. In some examples, aspects of the operations of 2020 may be performed by a report receiver as described with reference to FIGS. 6 through 9.

At 2025, the CED may update a channel configuration used by the channel engineering device for communications between the base station and the UE via the channel engineering device based on receiving the report. The operations of 2025 may be performed according to the methods described herein. In some examples, aspects of the operations of 2025 may be performed by a channel configuration component as described with reference to FIGS. 6 through 9.

Figure 21:
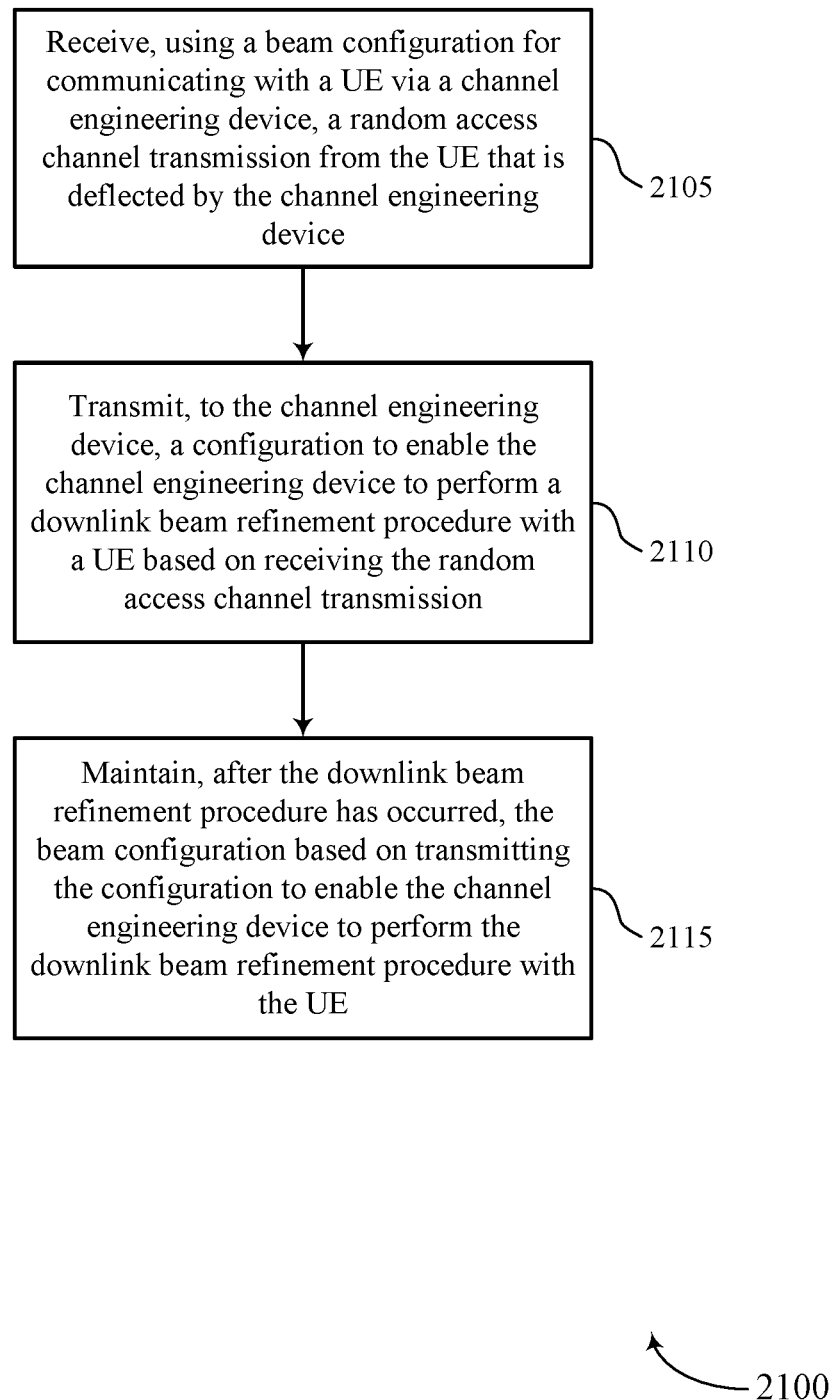

FIG. 21 shows a flowchart illustrating a method 2100 that supports offloading beam tracking using a reflector/refractor in accordance with aspects of the present disclosure. The operations of method 2100 may be implemented by a base station 105 or its components as described herein. For example, the operations of method 2100 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 2105, the base station may receive, using a beam configuration for communicating with a UE via a channel engineering device, a random access channel transmission from the UE that is deflected by the channel engineering device. The operations of 2105 may be performed according to the methods described herein. In some examples, aspects of the operations of 2105 may be performed by a RACH transmission receiver as described with reference to FIGS. 10 through 13.

At 2110, the base station may transmit, to the channel engineering device, a configuration to enable the channel engineering device to perform a downlink beam refinement procedure with a UE based on receiving the random access channel transmission.

The operations of 2110 may be performed according to the methods described herein. In some examples, aspects of the operations of 2110 may be performed by a downlink beam refinement procedure configuration transmitter as described with reference to FIGS. 10 through 13.

At 2115, the base station may maintain, after the downlink beam refinement procedure has occurred, the beam configuration based on transmitting the configuration to enable the channel engineering device to perform the downlink beam refinement procedure with the UE. The operations of 2115 may be performed according to the methods described herein. In some examples, aspects of the operations of 2115 may be performed by a beam configuration component as described with reference to FIGS. 10 through 13.

Figure 22:
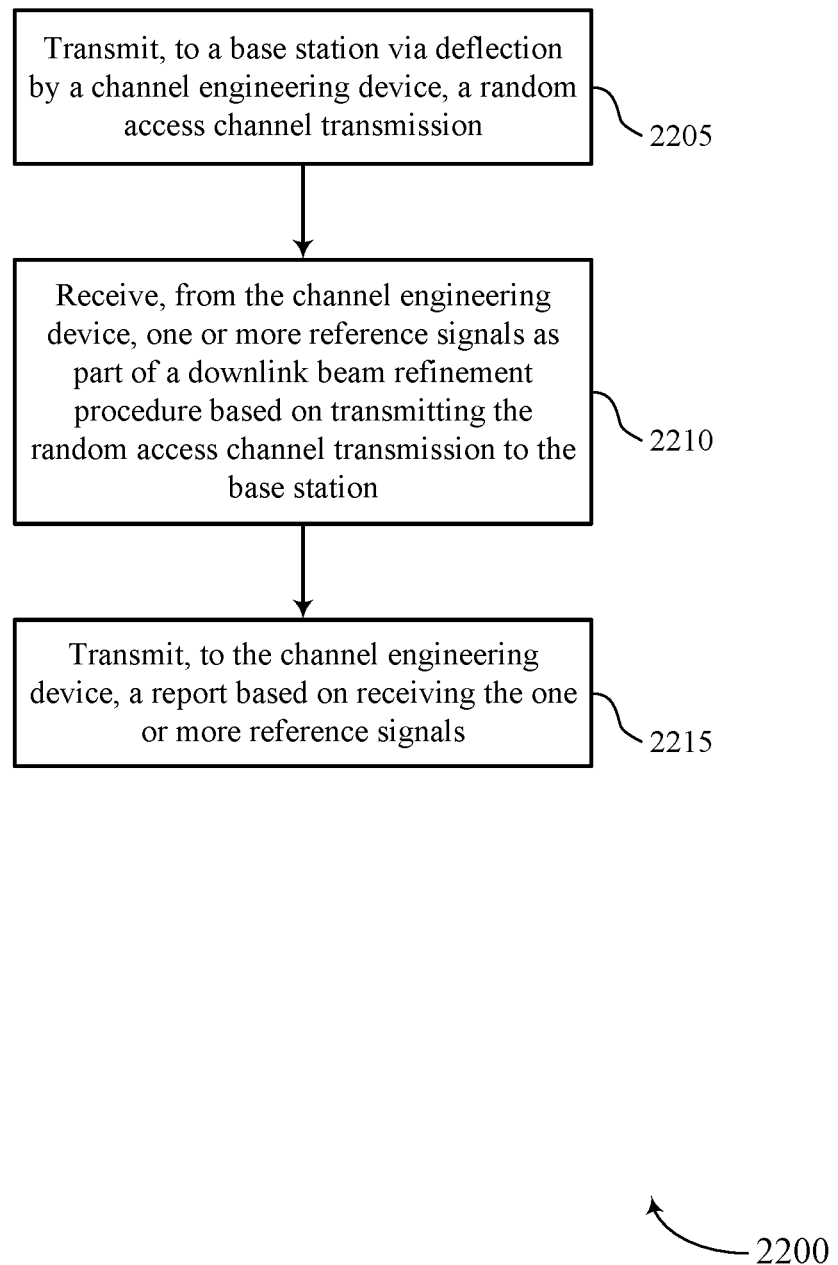

FIG. 22 shows a flowchart illustrating a method 2200 that supports offloading beam tracking using a reflector/refractor in accordance with aspects of the present disclosure. The operations of method 2200 may be implemented by a UE 115 or its components as described herein. For example, the operations of method 2200 may be performed by a communication manager as described with reference to FIGS. 14 through 17. In some examples, a UE may execute a set of instructions to control the functional elements of the UE to perform the described functions. Additionally or alternatively, a UE may perform aspects of the described functions using special-purpose hardware.

At 2205, the UE may transmit, to a base station via deflection by a channel engineering device, a random access channel transmission. The operations of 2205 may be performed according to the methods described herein. In some examples, aspects of the operations of 2205 may be performed by a RACH transmission transmitter as described with reference to FIGS. 14 through 17.

At 2210, the UE may receive, from the channel engineering device, one or more reference signals as part of a downlink beam refinement procedure based on transmitting the random access channel transmission to the base station. The operations of 2210 may be performed according to the methods described herein. In some examples, aspects of the operations of 2210 may be performed by a reference signal receiver as described with reference to FIGS. 14 through 17.

At 2215, the UE may transmit, to the channel engineering device, a report based on receiving the one or more reference signals. The operations of 2215 may be performed according to the methods described herein. In some examples, aspects of the operations of 2215 may be performed by a report transmitter as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a channel engineering device, comprising: receiving, from a base station, a configuration for performing a downlink beam refinement procedure with a UE; communicating, for the downlink beam refinement procedure, one or more reference signals to the UE over one or more beams; receiving, from the UE, a report based at least in part on communicating the one or more reference signals; and updating a channel configuration used by the channel engineering device for communications between the base station and the UE via the channel engineering device based at least in part on receiving the report.

Aspect 2: The method of aspect 1, wherein the communicating the one or more reference signals comprises: transmitting, by the channel engineering device, the one or more reference signals based at least in part on the configuration for performing the downlink beam refinement procedure with the UE.

Aspect 3: The method of aspect 2, further comprising: receiving, from the base station, an indication of one or more respective reference signal resources for the one or more reference signals, wherein the channel engineering device transmits the one or more reference signals over the one or more respective reference signal resources.

Aspect 4: The method of aspect 3, wherein the UE is located in a first direction from the channel engineering device, the method further comprising: suppressing the indication of the one or more respective reference signal resources from being communicated in the first direction.

Aspect 5: The method of any of aspects 1 through 4, further comprising: receiving the one or more reference signals from the base station, wherein communicating the one or more reference signals to the UE comprises deflecting the one or more reference signals to the UE.

Aspect 6: The method of aspect 5, wherein the one or more reference signals comprise a plurality of reference signals, the method further comprising: receiving, from the base station, an indication of an angle of deflection for each of the plurality of reference signals; and communicating via deflecting each of the plurality of reference signals according to the respective indication of the angle of deflection.

Aspect 7: The method of any of aspects 5 through 6, further comprising: transmitting, to the base station, a request for the one or more reference signals, wherein the one or more reference signals are communicated based at least in part on the request.

Aspect 8: The method of any of aspects 1 through 7, wherein the base station is located in a first direction from the channel engineering device, the method further comprising: suppressing the report from being communicated in the first direction.

Aspect 9: The method of any of aspects 1 through 8, further comprising: receiving a random access channel transmission from the UE; and directing the random access channel transmission via deflection to the base station.

Aspect 10: The method of any of aspects 1 through 9, wherein updating the channel configuration comprises updating a downlink beam used by the channel engineering device for communications between the UE and the base station, an angle of deflection used by the channel engineering device for communications between the UE and the base station, or any combination thereof.

Aspect 11: The method of any of aspects 1 through 10, wherein the one or more reference signals comprise a plurality of reference signals, the report indicates a reference signal of the plurality received with a highest signal strength, and updating the channel configuration is based at least in part on the report indicating the reference signal received with the highest signal strength.

Aspect 12: The method of any of aspects 1 through 11, wherein the configuration for performing the downlink beam refinement procedure indicates whether the channel engineering device is to generate the one or more reference signals at the channel engineering device or is to receive the one or more reference signals from the base station.

Aspect 13: A method for wireless communication at a base station, comprising: receiving, using a beam configuration for communicating with a UE via a channel engineering device, a random access channel transmission from the UE that is deflected by the channel engineering device; transmitting, to the channel engineering device, a configuration to enable the channel engineering device to perform a downlink beam refinement procedure with a UE based at least in part on receiving the random access channel transmission; and maintaining, after the downlink beam refinement procedure has occurred, the beam configuration based at least in part on transmitting the configuration to enable the channel engineering device to perform the downlink beam refinement procedure with the UE.

Aspect 14: The method of aspect 13, further comprising: transmitting, to the channel engineering device, an indication of one or more reference signal resources over which the channel engineering device is to transmit one or more reference signals.

Aspect 15: The method of aspect 14, wherein the configuration to enable the channel engineering device to perform the downlink beam refinement procedure indicates to the channel engineering device to transmit the one or more reference signals by the channel engineering device.

Aspect 16: The method of any of aspects 13 through 15, further comprising: transmitting one or more reference signals to the channel engineering device for deflection to the UE.

Aspect 17: The method of aspect 16, wherein the one or more reference signals comprise a plurality of reference signals, the method further comprising: transmitting, to the channel engineering device, an indication of an angle of deflection for each of the plurality of reference signals.

Aspect 18: The method of aspect 17, further comprising: transmitting each of the plurality of reference signals using the beam configuration, wherein at least one of the plurality of reference signals is associated with a different angle of deflection from another of the plurality of reference signals.

Aspect 19: The method of any of aspects 16 through 18, further comprising: receiving, from the channel engineering device, a request for the one or more reference signals, wherein the one or more reference signals are transmitted based at least in part on the request.

Aspect 20: The method of any of aspects 13 through 19, wherein the configuration for performing the downlink beam refinement procedure indicates whether the channel engineering device is to generate the one or more reference signals at the channel engineering device or is to receive the one or more reference signals from the base station.

Aspect 21: A method for wireless communication at a UE, comprising: transmitting, to a base station via deflection by a channel engineering device, a random access channel transmission; receiving, from the channel engineering device, one or more reference signals as part of a downlink beam refinement procedure based at least in part on transmitting the random access channel transmission to the base station; and transmitting, to the channel engineering device, a report based at least in part on receiving the one or more reference signals.

Aspect 22: The method of aspect 21, wherein receiving the one or more reference signals comprises receiving the one or more reference signals transmitted by the channel engineering device.

Aspect 23: The method of any of aspects 21 through 22, wherein receiving the one or more reference signals comprises receiving the one or more reference signals transmitted from the base station and deflected by the channel engineering device.

Aspect 24: The method of any of aspects 21 through 23, wherein the one or more reference signals comprise a plurality of reference signals, the report indicates a reference signal of the plurality received with a highest signal strength.

Aspect 25: An apparatus for wireless communication at a channel engineering device, comprising a processor; memory coupled with the processor; and instructions stored in the memory and executable by the processor to cause the apparatus to perform a method of any of aspects 1 through 12.

Aspect 26: An apparatus for wireless communication at a channel engineering device, comprising at least one means for performing a method of any of aspects 1 through 12.

Aspect 27: A non-transitory computer-readable medium storing code for wireless communication at a channel engineering device, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 20.

Aspect 29: An apparatus for wireless communication at a base station, comprising at least one means for performing a method of any of aspects 13 through 20.

Aspect 30: A non-transitory computer-readable medium storing code for wireless communication at a base station, the code comprising instructions executable by a processor to perform a method of any of aspects 13 through 20.

Aspect 31: An apparatus for wireless communication at a UE, comprising a processor; memory coupled with the processor; and instructions stored in the memory and executable by the processor to cause the apparatus to perform a method of any of aspects 21 through 24.

Aspect 32: An apparatus for wireless communication at a UE, comprising at least one means for performing a method of any of aspects 21 through 24.

Aspect 33: A non-transitory computer-readable medium storing code for wireless communication at a UE, the code comprising instructions executable by a processor to perform a method of any of aspects 21 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a channel engineering device, comprising:
receiving, from a base station, a configuration for performing a downlink beam refinement procedure with a user equipment (UE);
communicating, for the downlink beam refinement procedure, one or more reference signals to the UE over one or more beams;
receiving, from the UE, a report based at least in part on communicating the one or more reference signals; and
updating a channel configuration used by the channel engineering device for communications between the base station and the UE via the channel engineering device based at least in part on receiving the report.

2. The method of claim 1, wherein the communicating the one or more reference signals comprises:
transmitting, by the channel engineering device, the one or more reference signals based at least in part on the configuration for performing the downlink beam refinement procedure with the UE.

3. The method of claim 2, further comprising:
receiving, from the base station, an indication of one or more respective reference signal resources for the one or more reference signals, wherein the channel engineering device transmits the one or more reference signals over the one or more respective reference signal resources.

4. The method of claim 3, wherein the UE is located in a first direction from the channel engineering device, the method further comprising:
suppressing the indication of the one or more respective reference signal resources from being communicated in the first direction.

5. The method of claim 1, further comprising:
receiving the one or more reference signals from the base station, wherein communicating the one or more reference signals to the UE comprises deflecting the one or more reference signals to the UE.

6. The method of claim 5, wherein the one or more reference signals comprise a plurality of reference signals, the method further comprising:
receiving, from the base station, an indication of an angle of deflection for each of the plurality of reference signals; and
communicating via deflecting each of the plurality of reference signals according to the respective indication of the angle of deflection.

7. The method of claim 5, further comprising:
transmitting, to the base station, a request for the one or more reference signals, wherein the one or more reference signals are communicated based at least in part on the request.

8. The method of claim 1, wherein the base station is located in a first direction from the channel engineering device, the method further comprising:
suppressing the report from being communicated in the first direction.

9. The method of claim 1, further comprising:
receiving a random access channel transmission from the UE; and
directing the random access channel transmission via deflection to the base station.

10. The method of claim 1, wherein:
updating the channel configuration comprises updating a downlink beam used by the channel engineering device for communications between the UE and the base station, an angle of deflection used by the channel engineering device for communications between the UE and the base station, or any combination thereof.

11. The method of claim 1, wherein the one or more reference signals comprise a plurality of reference signals, wherein the report indicates a reference signal of the plurality received with a highest signal strength, and wherein updating the channel configuration is based at least in part on the report indicating the reference signal received with the highest signal strength.

12. The method of claim 1, wherein the configuration for performing the downlink beam refinement procedure indicates whether the channel engineering device is to generate the one or more reference signals at the channel engineering device or is to receive the one or more reference signals from the base station.

13. A method for wireless communication at a base station, comprising:
receiving, using a beam configuration for communicating with a user equipment (UE) via a channel engineering device, a random access channel transmission from the UE that is deflected by the channel engineering device;
transmitting, to the channel engineering device, a configuration to enable the channel engineering device to perform a downlink beam refinement procedure with a UE based at least in part on receiving the random access channel transmission; and
maintaining, after the downlink beam refinement procedure has occurred, the beam configuration based at least in part on transmitting the configuration to enable the channel engineering device to perform the downlink beam refinement procedure with the UE.

14. The method of claim 13, further comprising:
transmitting, to the channel engineering device, an indication of one or more reference signal resources over which the channel engineering device is to transmit one or more reference signals.

15. The method of claim 14, wherein the configuration to enable the channel engineering device to perform the downlink beam refinement procedure indicates to the channel engineering device to transmit the one or more reference signals by the channel engineering device.

16. The method of claim 13, further comprising:
transmitting one or more reference signals to the channel engineering device for deflection to the UE.

17. The method of claim 16, wherein the one or more reference signals comprise a plurality of reference signals, the method further comprising:
transmitting, to the channel engineering device, an indication of an angle of deflection for each of the plurality of reference signals.

18. The method of claim 17, further comprising:
transmitting each of the plurality of reference signals using the beam configuration, wherein at least one of the plurality of reference signals is associated with a different angle of deflection from another of the plurality of reference signals.

19. The method of claim 16, further comprising:
receiving, from the channel engineering device, a request for the one or more reference signals, wherein the one or more reference signals are transmitted based at least in part on the request.

20. The method of claim 13, wherein the configuration for performing the downlink beam refinement procedure indicates whether the channel engineering device is to generate the one or more reference signals at the channel engineering device or is to receive the one or more reference signals from the base station.

21. A method for wireless communication at a UE, comprising:
transmitting, to a base station via deflection by a channel engineering device, a random access channel transmission;
receiving, from the channel engineering device, one or more reference signals as part of a downlink beam refinement procedure based at least in part on transmitting the random access channel transmission to the base station; and
transmitting, to the channel engineering device, a report based at least in part on receiving the one or more reference signals.

22. The method of claim 21, wherein:
receiving the one or more reference signals comprises receiving the one or more reference signals transmitted by the channel engineering device.

23. The method of claim 21, wherein:
receiving the one or more reference signals comprises receiving the one or more reference signals transmitted from the base station and deflected by the channel engineering device.

24. The method of claim 21, wherein the one or more reference signals comprise a plurality of reference signals, wherein the report indicates a reference signal of the plurality received with a highest signal strength.

25. An apparatus for wireless communication at a channel engineering device, comprising:
a processor,
memory in electronic communication with the processor, and
instructions stored in the memory and executable by the processor to cause the apparatus to:
receive, from a base station, a configuration for performing a downlink beam refinement procedure with a user equipment (UE);
communicate, for the downlink beam refinement procedure, one or more reference signals to the UE over one or more beams;
receive, from the UE, a report based at least in part on communicating the one or more reference signals; and
update a channel configuration used by the channel engineering device for communications between the base station and the UE via the channel engineering device based at least in part on receiving the report.

26. The apparatus of claim 25, wherein the communicating the one or more reference signals comprises:
transmit, by the channel engineering device, the one or more reference signals based at least in part on the configuration for performing the downlink beam refinement procedure with the UE.

27. The apparatus of claim 26, wherein the instructions are further executable by the processor to cause the apparatus to:
receive, from the base station, an indication of one or more respective reference signal resources for the one or more reference signals, wherein the channel engineering device transmits the one or more reference signals over the one or more respective reference signal resources.

28. The apparatus of claim 27, wherein the UE is located in a first direction from the channel engineering device, wherein the instructions are further executable by the processor to cause the apparatus to:
suppress the indication of the one or more respective reference signal resources from being communicated in the first direction.

29. The apparatus of claim 25, wherein the instructions are further executable by the processor to cause the apparatus to:
receive the one or more reference signals from the base station, wherein communicating the one or more reference signals to the UE are executable by the processor to cause the apparatus to deflect the one or more reference signals to the UE.

30. The apparatus of claim 29, wherein the one or more reference signals comprise a plurality of reference signals, and the instructions are further executable by the processor to cause the apparatus to:
receive, from the base station, an indication of an angle of deflection for each of the plurality of reference signals; and
communicate via deflecting each of the plurality of reference signals according to the respective indication of the angle of deflection.

* * * * *